(12) United States Patent
Bogle et al.

(10) Patent No.: US 6,334,528 B1
(45) Date of Patent: Jan. 1, 2002

(54) VARIABLE-WIDTH SPACER

(75) Inventors: David W. Bogle, Destrehan, LA (US); Mark W. Davidson, Greer, SC (US)

(73) Assignees: The Laitram Corporation, Harahan, LA (US); Hartness International, Greenville, SC (US)

( * ) Notice: Subject to any disclaimer, the term of this patent is extended or adjusted under 35 U.S.C. 154(b) by 0 days.

(21) Appl. No.: 09/594,718

(22) Filed: Jun. 16, 2000

(51) Int. Cl.⁷ .............................................. B65G 15/10
(52) U.S. Cl. .................................................. 198/836.3
(58) Field of Search .......................... 198/836.3, 594, 198/445

(56) References Cited

U.S. PATENT DOCUMENTS

| | | | | |
|---|---|---|---|---|
| 4,364,465 A | * | 12/1982 | Kraft et al. ................. | 198/452 |
| 4,413,724 A | * | 11/1983 | Fellner ....................... | 198/594 |
| 4,513,858 A | * | 4/1985 | Fellner et al. .............. | 198/812 |
| 4,549,647 A | * | 10/1985 | Cosse ....................... | 198/594 X |
| 5,772,005 A | * | 6/1998 | Hansch ....................... | 198/594 |
| 6,026,947 A | * | 2/2000 | Persson ....................... | 198/364 |
| 6,152,291 A | * | 11/2000 | Steeber et al. .............. | 198/594 |
| 6,182,812 B1 | * | 2/2001 | Hartness, III et al. ...... | 198/364 |

* cited by examiner

Primary Examiner—Stephen T. Gordon
Assistant Examiner—Patricia L. Engle
(74) Attorney, Agent, or Firm—Michael Tobias

(57) ABSTRACT

A variable-width spacer for use in a conveying apparatus includes a first link and a second link on opposite widthwise side of the spacer. The links can move relative to each other in a widthwise direction of the spacer to vary its width. The spacer can be used to fill a gap between adjoining members of a conveying apparatus, such as between two conveyor belts.

46 Claims, 18 Drawing Sheets

VARIABLE-WIDTH SPACER

BACKGROUND OF THE INVENTION

1. Field of the Invention

This invention relates to a variable-width spacer suitable for installation between components of a conveying apparatus.

2. Description of the Related Art

A conveying apparatus employing a conveyor belt may require objects being transported by the conveying apparatus to cross a gap between a moving conveyor belt and another component of the conveying apparatus. For example, some conveying apparatuses are designed to slide objects across a gap between two conveyor belts moving in parallel but in opposite directions to each other to transfer the objects between the two conveyor belts. However, if the gap between the conveyor belts is large, the objects may fall into or be caught in the gap in the process of being transferred between the two conveyor belts, resulting in possible damage to the objects being conveyed or to the conveying apparatus itself.

SUMMARY OF THE INVENTION

The present invention provides a variable-width spacer suitable for installation in a gap between components of a conveying apparatus, and particularly between components undergoing movement relative to each other.

The present invention also provides a conveying apparatus employing such a spacer.

The present invention additionally provides a method of operating a conveying apparatus.

According to one form of the present invention, a variable-width spacer for installation in a gap between components of a conveying apparatus includes first and second links and a guide which guides the first and second links for relative movement in the widthwise direction of the spacer to adjust the width of the spacer. Each link has an outer side for moving contact with a component of a conveying apparatus.

According to another form of the present invention, a variable-width spacer includes first and second links movable relative to each other in the widthwise direction of the spacer, and a biasing member disposed between the first and second links and urging the links away from each other in the widthwise direction of the spacer.

According to still another form of the present invention, a variable-width spacer includes a plurality of first links connected in series on a first widthwise side of the spacer and a plurality of second links connected in series on a second widthwise side of the spacer opposing the first links. The first and second links are capable of relative movement in the widthwise direction of the spacer to adjust the width of the spacer.

In preferred embodiments, the spacer is a flexible member which can change in shape so as to be capable of installation in a gap following a curved path. However, the spacer may also be a rigid member having a constant shape.

In one form of the invention, each link of the spacer is capable of overlapping an opposing link in the widthwise direction of the spacer to decrease the minimum distance between opposing links or to cover a gap between opposing links to prevent objects being carried across the spacer from falling into or being caught in the gap.

According to yet another form of the present invention, a conveying apparatus includes first and second components separated by a gap, and a variable-width spacer disposed in the gap. The spacer may include first and second links disposed on opposite widthwise sides of the spacer and movable with respect to each other in the widthwise direction of the spacer to vary the width of the spacer.

In still another form of the present invention, a method of operating a conveying apparatus includes transporting an object using the conveying apparatus with a variable-width spacer disposed in a gap between first and second components of the conveying apparatus. In preferred embodiments, the components of the conveying apparatus are conveyor belts.

DESCRIPTION OF THE PREFERRED EMBODIMENTS

Figure 1:
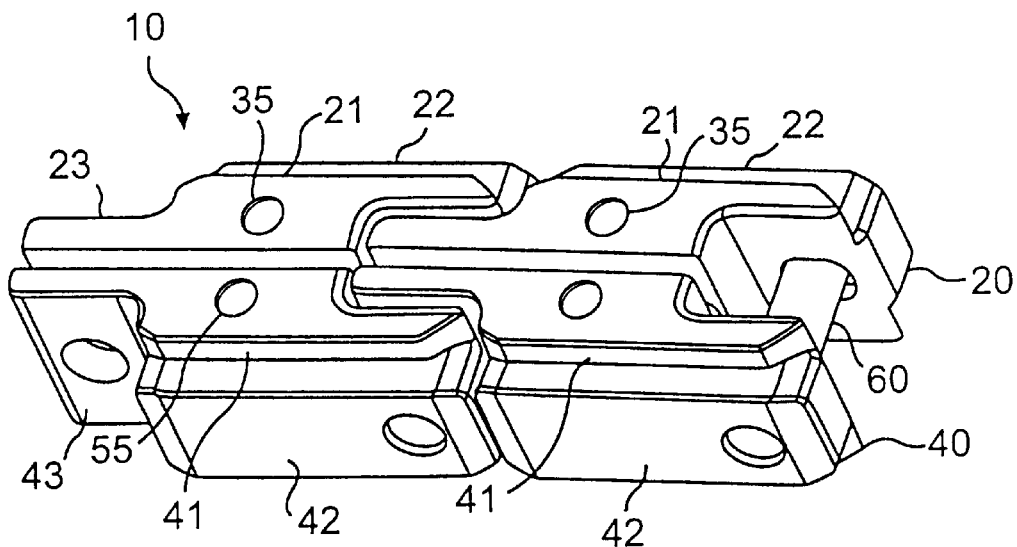
FIG. 1 is an axonometric view of a portion of an embodiment of a variable-width spacer according to the present invention.
Figure 2:
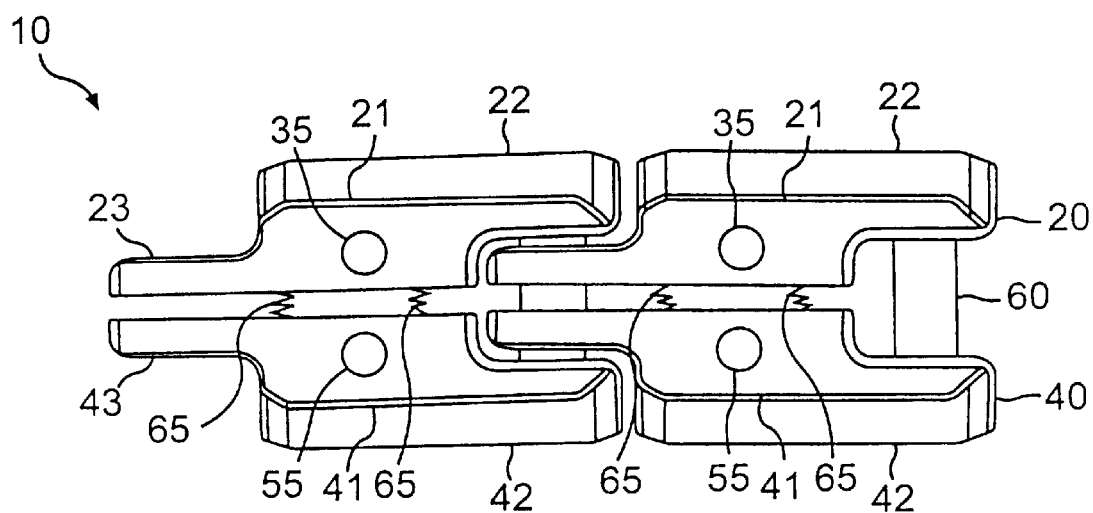
FIG. 2 is a plan view of the embodiment of FIG. 1.
Figure 3:
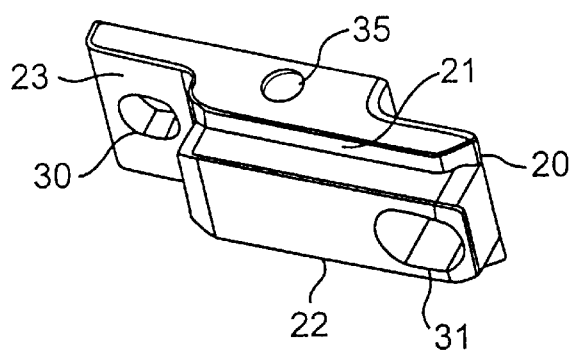
FIGS. 3 and 4 are axonometric views of the outer and inner sides of one of the first links of the embodiment of FIG. 1.

A number of preferred embodiments of a variable-width spacer according to the present invention will be described while referring to the accompanying drawings. FIGS. 1–8 illustrate a first embodiment of a spacer 10. As shown in these drawings, this embodiment includes a plurality of first links 20 arranged in series on a first widthwise side of the spacer 10 (the upper side in FIGS. 1 and 2), and a plurality of second links 40 arranged in series on a second widthwise side of the spacer 10 (the lower side in FIGS. 1 and 2) opposing the first links 20. The first and second links 20 and 40 are capable of moving relative to each other in the widthwise direction of the spacer 10 (in the vertical direction in FIG. 2) to adjust the width of the spacer 10. FIGS. 1 and 2 illustrate a spacer 10 comprising only two of the first links 20 and two of the second links 40, but any number of links can be connected in series to obtain a spacer of any desired length. Alternatively, a spacer may comprise a single one of each of the two types of links 20 and 40.

Each of the links has a top side (the side in which holes 35 and 55 are visible in FIGS. 1 and 2) which normally faces upwards during use of the spacer 10 and supports objects being transported across the spacer 10, and a bottom side which normally faces downwards. In addition, each link has an inner side which faces the links on the opposite widthwise side of the spacer 10, and an outer side which faces away from the opposite widthwise side and towards an adjoining component of a conveying apparatus in which the spacer 10 is installed. The spacer 10 and the components of the conveying apparatus adjoining the outer sides of the links will in many cases be undergoing relative movement in the lengthwise direction of the spacer 10 and may be in sliding contact with each other, so the outer sides of the links are preferably capable of permitting smooth relative movement of the spacer 10 and the adjoining components.

Figure 8:
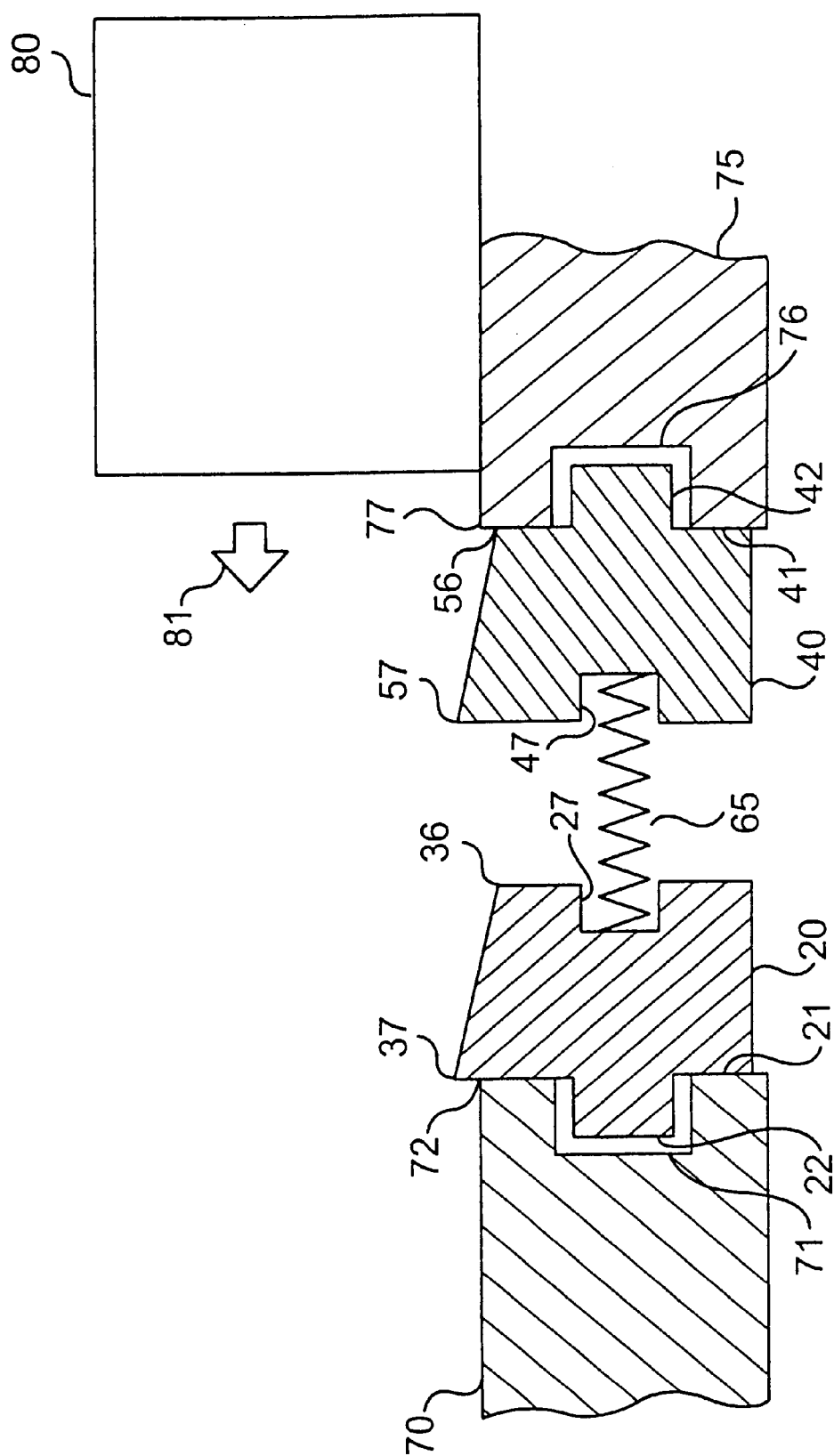
FIG. 8 is a schematic transverse cross-sectional view of the spacer of FIG. 1 disposed between two conventional conveyor belts.

The shape of the outer sides of the links can be selected in accordance with the shape of the components which the outer sides of the links are intended to adjoin during use of the spacer 10. Frequently the adjoining components will be conveyor belts. Some existing conveyor belts have an elongated, longitudinally extending groove formed in a widthwise edge thereof, so in the present embodiment, the outer side of each first link 20 is shaped so as to be able to slidably engage such a groove. Each of the first links 20 has two bearing surfaces 21 adjoining the top and bottom sides of the link 20 and a projection 22 disposed between and projecting from the bearing surfaces 21. As shown in FIG. 8, which is a schematic transverse cross-sectional view of the spacer 10 of FIG. 1 installed between two conventional conveyor belts 70 and 75, the projection 22 of each first link 20 can be inserted into a longitudinally-extending groove 71 of one of the conveyor belts 70 with the bearing surfaces 21 located outside of the groove 71 and opposing the widthwise edge surface of the conveyor belt 70.

Similarly, the outer side of each of the second links 40 has two bearing surfaces 41 adjoining its top and bottom sides and a projection 42 disposed between and projecting from the bearing surfaces 41. As also shown in FIG. 8, the projection 41 of each second link 40 can be inserted into a longitudinally-extending groove 76 of the other conveyor belt 75 with the bearing surfaces 41 located outside the groove 76 and opposing the widthwise edge surface of the conveyor belt 75.

The projections 22 and 42 on the first and second links 20 and 40 are sized so as to be able to freely slide inside the grooves 71 and 76 in the conveyor belts 70 and 75. The bearing surfaces 21 and 41 and/or the outer surfaces of the projections 22 and 42 may be pressed into constant contact with the conveyor belts 70 and 75, or they may be spaced from the conveyor belts. The two conveyor belts 70 and 75 may support the weight of the spacer 10, or the spacer 10 may be supported by a member separate from the conveyor belts, such as a support surface disposed beneath the conveyor belts.

Each projection 22 and 42 extends for only a portion of the length of the link 20 and 40. At the left ends of the first and second links 20 and 40 in FIG. 2, the outer side of each link has a region of reduced thickness to define a ledge 23 and 43 adjoining and lower than the projection 22 and 42 of the link.

Figure 4:
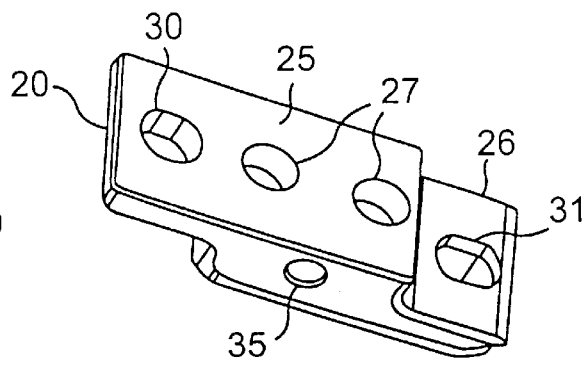
Figure 5:
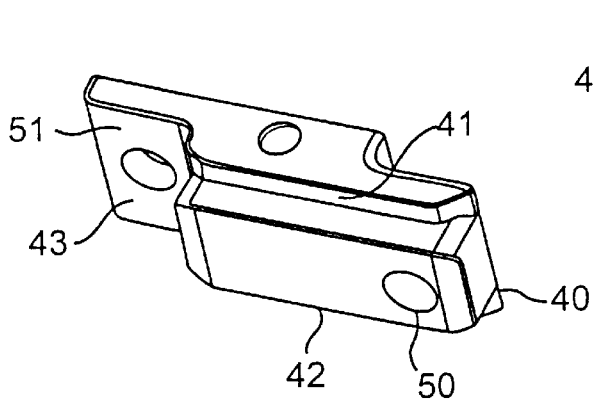
FIGS. 5 and 6 are axonometric views of the outer and inner sides of one of the second links of the embodiment of FIG. 1.

As shown in FIG. 4, the inner side of each of the first links 20 has a substantially planar first region 25 capable of contacting an opposing second link 40 and a substantially planar second region 26 separated from and lower than the first region 25 by a step. When a plurality of the first links 20 are connected in series, the ledge 23 on the outer side of one first link 20 overlaps the second region 26 of the inner side of the adjoining first link 20 in the lengthwise direction of the spacer 10.

Figure 6:
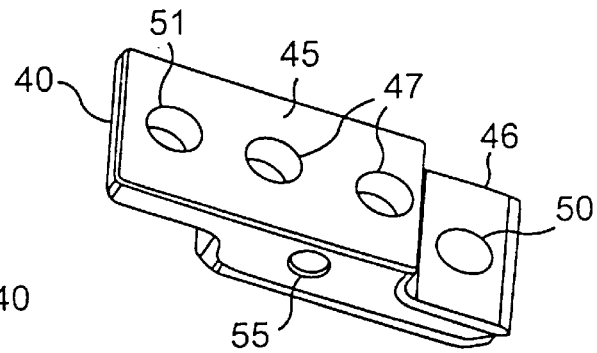

As shown in FIG. 6, the inner side of each of the second links 40 also has a substantially planar first region 45 capable of contacting the first region 25 of an opposing one of the first links 20 and a substantially planar second region 46 separated from and lower than the first region 45 by a step. When a plurality of the second links 40 are connected in series, the ledge 43 on the outer side of one second link 40 overlaps the second region 46 of the inner side of the adjoining second link 40 in the lengthwise direction of the spacer 10.

As shown in FIG. 2, the thickness of each of the links measured at the ledges 23 and 43 is preferably such that the outer sides of two adjoining links 20, 20 or 40, 40 connected in series can be flush with one another at the same time that the inner sides of the two adjoining links are flush with one another.

Figure 7:
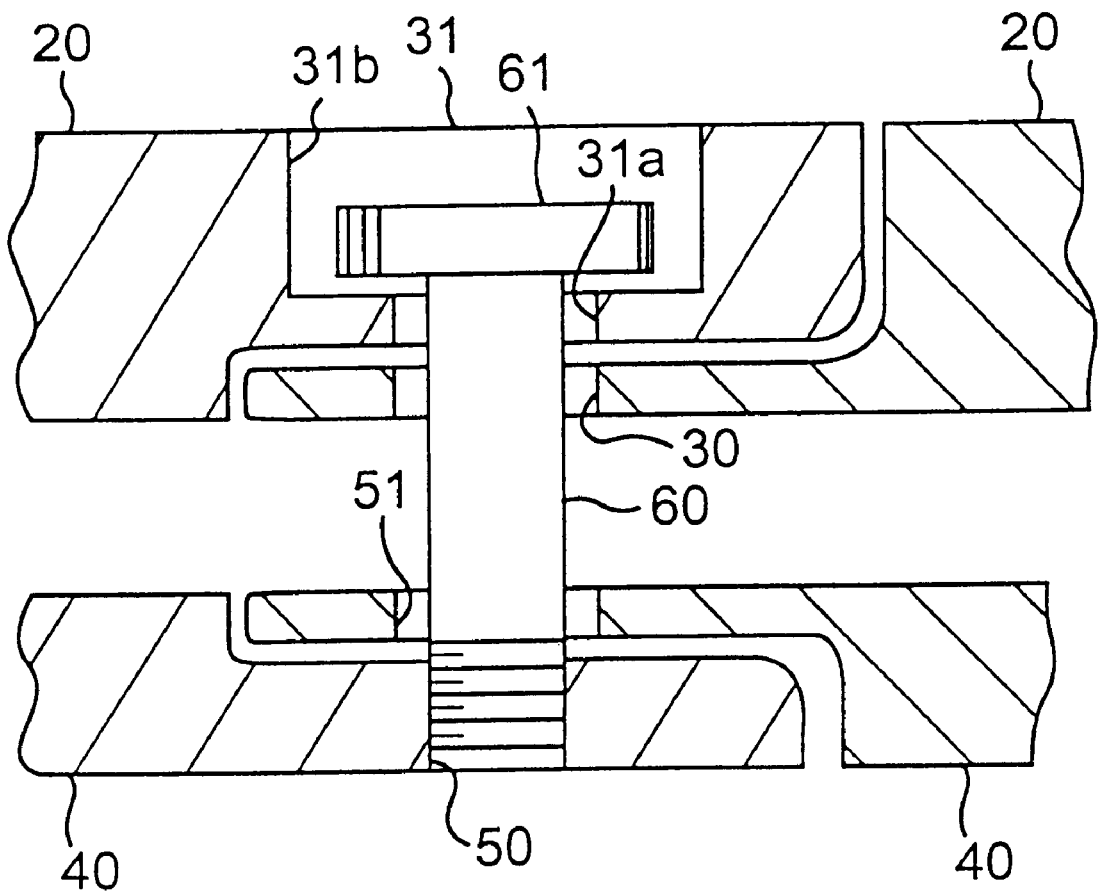
FIG. 7 is a longitudinal cross-sectional view of the junction of adjoining links in FIG. 2.

Adjoining links may be connected in series to each other in any manner which enables opposing first and second links 20 and 40 to undergo relative movement in the widthwise direction of the spacer 10 to vary the width of the spacer 10. In the present embodiment, adjoining links are connected in series to each other by connecting pins 60 extending in the widthwise direction of the spacer 10. FIG. 7 is an enlarged longitudinal cross-sectional view of the central portion of FIG. 2 where a plurality of the links are connected with each other by one of the connecting pins 60. The lower end of the connecting pin 60 in the figure is secured to the right end of one of the second links 40, such as by being bonded or press fit inside a hole 50 formed in the right end. The lower end may be formed with external threads, grooves, or other surface irregularities to more tightly connect the lower end to the inner surface of the hole 50 in which it is secured. The connecting pin 60 then passes loosely through a hole 51 formed in the left end of an adjoining second link 40, and it passes loosely through a hole 30 formed in the left end of one of the first links 20. The connecting pin 60 then passes loosely through a hole 31 in the right end of an adjoining one of the first links 20. This hole 31 has a first region 31a and a counterbored second region 31b adjoining the first region 31a but having a larger diameter than the first region 31a. At its upper end, the connecting pin 60 has an enlarged head 61 which is loosely received in the second region 31b of the hole 31 and which is larger in diameter than the first region 31a. Since the head 61 of the pin 60 cannot pass through the first region 31a of the hole 31, it acts as a stop and limits the distance by which the first links 20 can move away from the second links 40 in the widthwise direction of the spacer 10.

The first and second links 20 and 40 can slide along the connecting pins 60 until the first regions 25 and 45 of the inner sides of the first and second links 20 and 40 contact each other. The connecting pins 60 thus serve to connect adjoining links to each other in series as well as to act as guides for opposing links as they move towards and away from each other in the widthwise direction of the spacer 10. When the spacer 10 includes a larger number of links 20, 40 than shown in FIGS. 1 and 2, the additional links can be connected in series with the illustrated links in the same manner using additional connecting pins 60. The left end of the spacer 10 in FIGS. 1 and 2 can be terminated or can be connected to another member in any suitable manner, such as by a pin or a bolt which passes through holes 30 and 51 to permit the endmost opposing links 20, 40 to move towards and away from each other in the widthwise direction of the spacer 10.

In the present embodiment, the connecting pins 60 enable adjoining links to pivot with respect to each other about the axes of the connecting pins 60 with which they engage. However, since the spacer 10 will typically lie in a single plane (such as a horizontal plane) parallel to the axes of all the connecting pins 60, it is generally not necessary for adjoining links to be able to pivot about the axes of the connecting pins 60. Therefore, adjoining links may be connected to the connecting pins 60 in a manner which does not permit pivoting about the axes of the connecting pins 60.

On the other hand, it may be desirable for the spacer 10 to be able to bend in the plane in which it is disposed so as to be able to be conform to a curved gap between components of a conveying apparatus. In the present embodiment, adjoining links are permitted to bend with respect to each other in the plane of the spacer 10 by sizing holes 30, 31, and 51 in the links through which the connecting pins 60 pass so as to fit loosely around the connecting pins 60.

When the spacer 10 is bent to define a curve in the plane in which it is disposed, if the connecting pins 60 maintain opposing pairs of first and second links 20 and 40 substantially radially aligned with each other, the separation between adjoining links in the lengthwise direction of the spacer 10 will be greater on the outer radius of the curve than on the inner radius. Changes in the separation between adjoining links when the spacer 10 assumes a curved shape can be accommodated by making the holes for the connecting pins 60 sufficiently large to permit some relative movement of adjoining links in the lengthwise direction of the spacer 10 so that the amount of overlap between them in the lengthwise direction can vary. For example, as best shown in FIG. 4, in the present embodiment, each of the holes 30, 31 in the first links 20 for the connecting pins 60 is elongated in the lengthwise direction of the first link 20. In this manner, the lengthwise overlap between adjoining first links 20 can be either greater or less than the lengthwise overlap between adjoining second links 40, depending upon whether the first links 20 are disposed on the inner radius or the outer radius of a curve.

The spacer 10 is preferably equipped with biasing members which urge opposing first and second links 20 and 40 away from each other in the widthwise direction of the spacer 10 but which can be compressed to enable opposing links to move towards each other in the widthwise direction of the spacer 10 to adjust the width of the spacer. In the present embodiment, biasing members are in the form of helical compression springs 65 sandwiched between opposing links 20 and 40. Each spring 65 has a first end received in a recess 27 formed in the inner side of one of the first links 20 and a second end received in a similar recess 47 formed in the inner side of one of the second links 40. The present embodiment includes two biasing springs 65 for each opposing pair of links 20 and 40, but a larger or smaller number of springs may be employed, depending upon the length of the links and the biasing force which it is desired to exert with the springs 65. Many other types of biasing members other than helical springs can be employed, such as leaf springs, Belleville springs, elastically compressible glands, or elastomeric spacers. As shown in FIG. 8, in the present embodiment, the biasing springs 65 are selected so as to press the bearing surfaces 21 and 41 on the outer sides of the links 20 and 40 against the widthwise edges of the conveyor belts 70 and 75 adjoining the spacer 10 so as to maintain constant engagement between the projections 22 and 42 on the links and the grooves 71 and 76 in the conveyor belts.

In some applications, a user may wish to mount equipment on the spacer 10. For example, it is sometimes useful to mount a vertical partition atop the spacer 10 to prevent objects from moving across the spacer 10 except in desired locations. Each of the illustrated links 20 and 40 includes a hole 35 or 55 in its top side into which a pin or rod can be inserted to support a partition or other suitable equipment. The holes 35, 55 may extend partway or all the way through the height of a link.

When the spacer 10 is disposed in a gap between two conveyor belts 70 and 75 as shown in FIG. 8, for example, and objects 80 (such as cans, bottles, boxes, or other merchandise) are to be transferred across the spacer 10 from right to left in the figure from one conveyor belt 75 to the other conveyor belt 70 in the direction of arrow 81, the outer edge 56 of the top side of each second link 40 is preferably no higher than the lefthand edge 77 of the top side of the adjoining conveyor belt 75, since if the outer edge 56 of the second link 40 projects above the lefthand edge 77 of the conveyor belt 75 where they adjoin each other, objects 80 being transferred across the spacer 10 may catch on and be obstructed by the outer edge 56, whereas a small downward step from edge 77 to edge 56 will not obstruct movement of the object 80. For the same reason, the inner edge 36 on the top side of the first link 20 is preferably no higher than the inner edge 57 on the top side of the opposing second link 40, and the righthand edge 72 on the top side of conveyor belt 70 is preferably no higher than the outer edge 37 on the top side of the first link 20 which it adjoins. In the present embodiment, each link 20, 40 is dimensioned such that when the projections 22 and 42 of the links are received in the grooves 71 and 76 of conveyor belts 70 and 75 as shown in FIG. 8, the outer edge 56 of the top side of each second link 40 is slightly lower than the lefthand edge 77 of the top side of the adjoining conveyor belt 75, and the outer edge 37 of the top side of each first link 20 is slightly higher than the righthand edge 72 of the adjoining conveyor belt 70. Furthermore, the inner edge 57 of the top side of each second link 40 is slightly higher than the inner edge 36 of the top side of the opposing first link 20. The difference between the heights of the edges of two adjoining members is preferably at least as large as the tolerance in the dimensions of the members, and it is preferably no more than about 1/16 inch to prevent objects from excessively tipping when passing over the edges of adjoining members. For example, in the present embodiment, the difference in height is approximately 1/32 inch. One way of achieving the difference in height between adjoining edges is to form the top sides of the first and second links 20 and 40 with a slight slope. For example, in FIG. 8, the top side of the second link 40 slopes slightly upwards from its outer edge 56 to its inner edge 57 (from the right side to the left side in the figure), and the top side of the first link 20 slopes slightly upwards from its inner edge 36 to its outer edge 37. In this manner, a difference in the height of the edges of adjoining members can be obtained while enabling the top sides of the conveyor belts 70 and 75 to be flush with each other, which is convenient from the standpoint of ease of assembly of a conveying apparatus.

For some objects 80, a spacer having a top side which is horizontal may be preferable to one having a top side which slopes in the manner shown in FIG. 8. Therefore, the bottom sides of the links 20 and 40 in FIG. 8 are horizontal. When it is desired to have a horizontal surface for supporting an object 80, the spacer 10 may be flipped over with the bottom sides facing upwards and flush with the top sides of the conveyor belts 70 and 75, and the bottom sides of the links 20 and 40 may be used to support an object. Alternatively, the bottom sides of the links 20 and 40 may be formed with the same sloping shape as the top sides so that the top and bottom sides of the spacer 10 can be used interchangeably.

The dimensions of the individual links 20, 40 can be selected based on the size and the shape of the gap in which the spacer 10 is to be installed. If it is desired to install the spacer 10 in a curved region of a gap, short links are advantageous since decreasing the lengths of the links decreases the minimum radius of curvature of a gap capable of accommodating the spacer 10. However, if the gap does not curve along its length, a single link may have a length equal to the length of the gap. The illustrated links 20, 40 each have an overall length of somewhat less than 2 inches. The overall length of the spacer 10 is not restricted and can be selected based on the length of the gap in which the spacer 10 is installed. In a typical application, the length may range from several inches up to 10 feet.

When opposing first and second links 20 and 40 of the spacer 10 are not contacting each other, a gap exists between the inner sides of opposing links. In the present embodiment, the centerline of this gap extends substantially along a straight line in the lengthwise direction of the spacer 10, and the gap between opposing links has a rectangular shape elongated in the lengthwise direction of the spacer 10. The minimum distance between two opposing links is thus the widthwise separation between the links.

Figure 9:
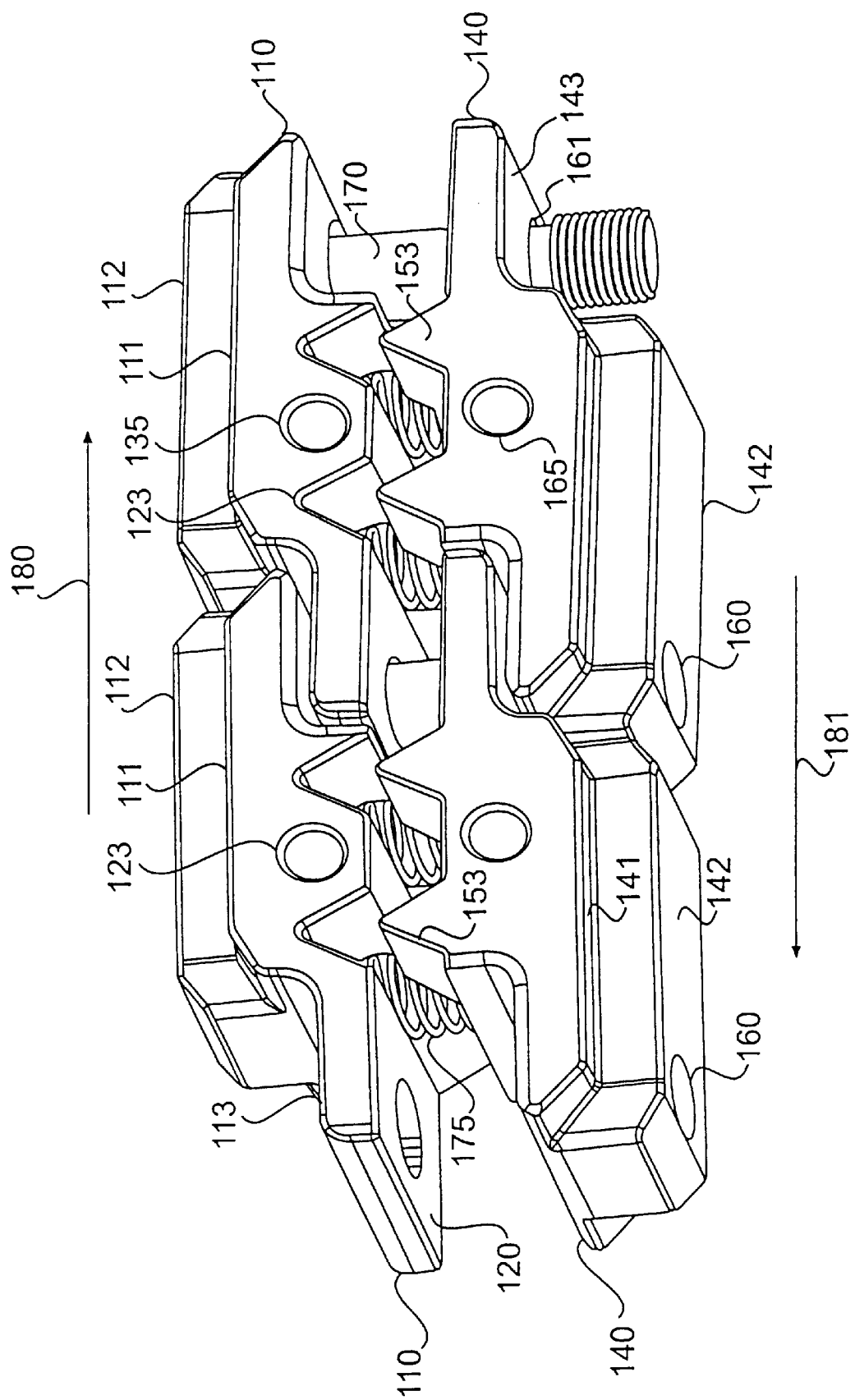
FIG. 9 is an axonometric view of another embodiment of a variable-width spacer according to the present invention in an expanded state.
Figure 10:
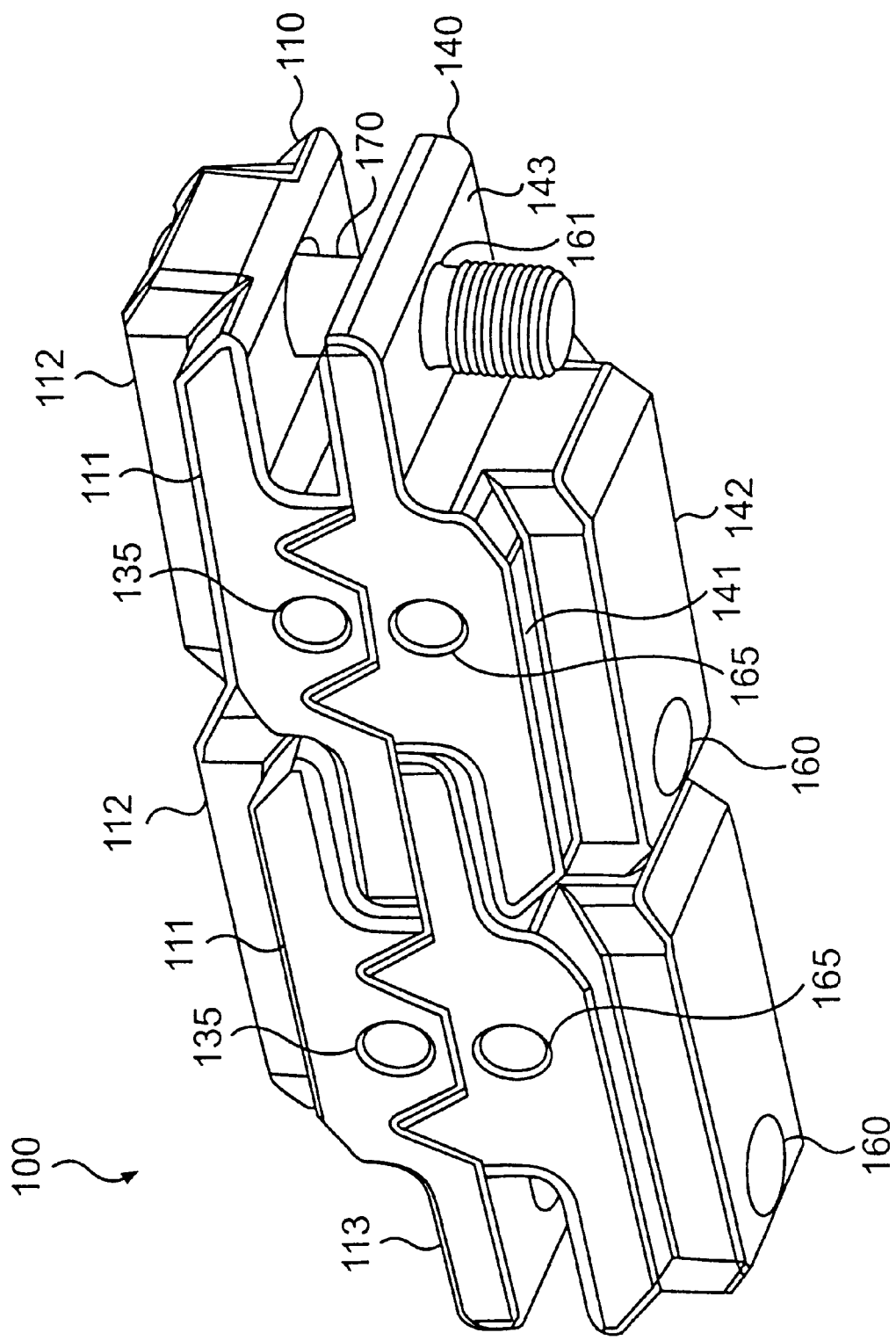
FIG. 10 is an axonometric view of the embodiment of FIG. 9 in a contracted state.

FIGS. 9–13 illustrate another embodiment of a spacer 100 according to the present invention in which the centerline of the gap between opposing links on opposite widthwise sides of the spacer 100 changes in direction along its length. Furthermore, opposing first and second links are able to overlap each other in the widthwise direction of the spacer so that the minimum distance between two opposing links can be less than the widthwise separation between them. Like the preceding embodiment, this embodiment includes a plurality of first links 110 connected in series on a first widthwise side of the spacer 100, and a plurality of second links 140 connected in series on a second widthwise side of the spacer 100 opposing the first links 110. Opposing first and second links 110 and 140 can move with respect to each other in the widthwise direction of the spacer 100 to adjust the width of the spacer 100. FIG. 9 shows the spacer 100 in an expanded state with a maximum widthwise separation between opposing links, and FIG. 10 shows the spacer 100 in a contracted state with the links moved towards each other until the separation between opposing links 110 and 140 is a minimum and the opposing links are contacting each other. In this contracted state, opposing links overlap each other in the widthwise direction of the spacer 100. As with the preceding embodiment, the spacer 100 may include one or a plurality of each type of link.

Each of the links has a top side (the side having holes 135 and 165 visible therein in FIG. 9) which normally faces upwards during use of the spacer 100, and a bottom side which normally faces downwards. Each link also has an inner side which opposes the inner side of an opposing link and an outer side which faces away from the opposing links and towards an adjoining component of a conveying system in which the spacer 100 is installed.

The outer sides of the illustrated first links 110 are similar to those of the embodiment of FIG. 1 and include two bearing surfaces 111 adjoining the top and bottom sides of the link 110 and a projection 112 disposed between and projecting from the bearing surfaces 111. The outer sides of the second links 140 also include two bearing surfaces 141 adjoining the top and bottom sides of the link 140 and a projection 142 disposed between and projecting from the bearing surfaces 141. The spacer 100 can be installed in a gap between two conveyor belts in the same manner as shown in FIG. 8 with respect to the preceding embodiment, with each projection 112 and 142 slidably received in a groove 71 or 76 of one of the conveyor belts 70 and 75 and with the bearing surfaces 111 and 141 located outside of the grooves 71 and 76 and opposing the widthwise edge surfaces of the conveyor belts 70 and 75. The projections 112 and 142 extend for only a portion of the lengths of the links. The outer side of each first link 110 has a region of reduced thickness at its left end in FIG. 9 to define a ledge 113 adjoining projection 112, and the outer side of each second link 140 has a region of reduced thickness at its right end in FIG. 9 to define a ledge 143 adjoining projection 142.

Figure 12:
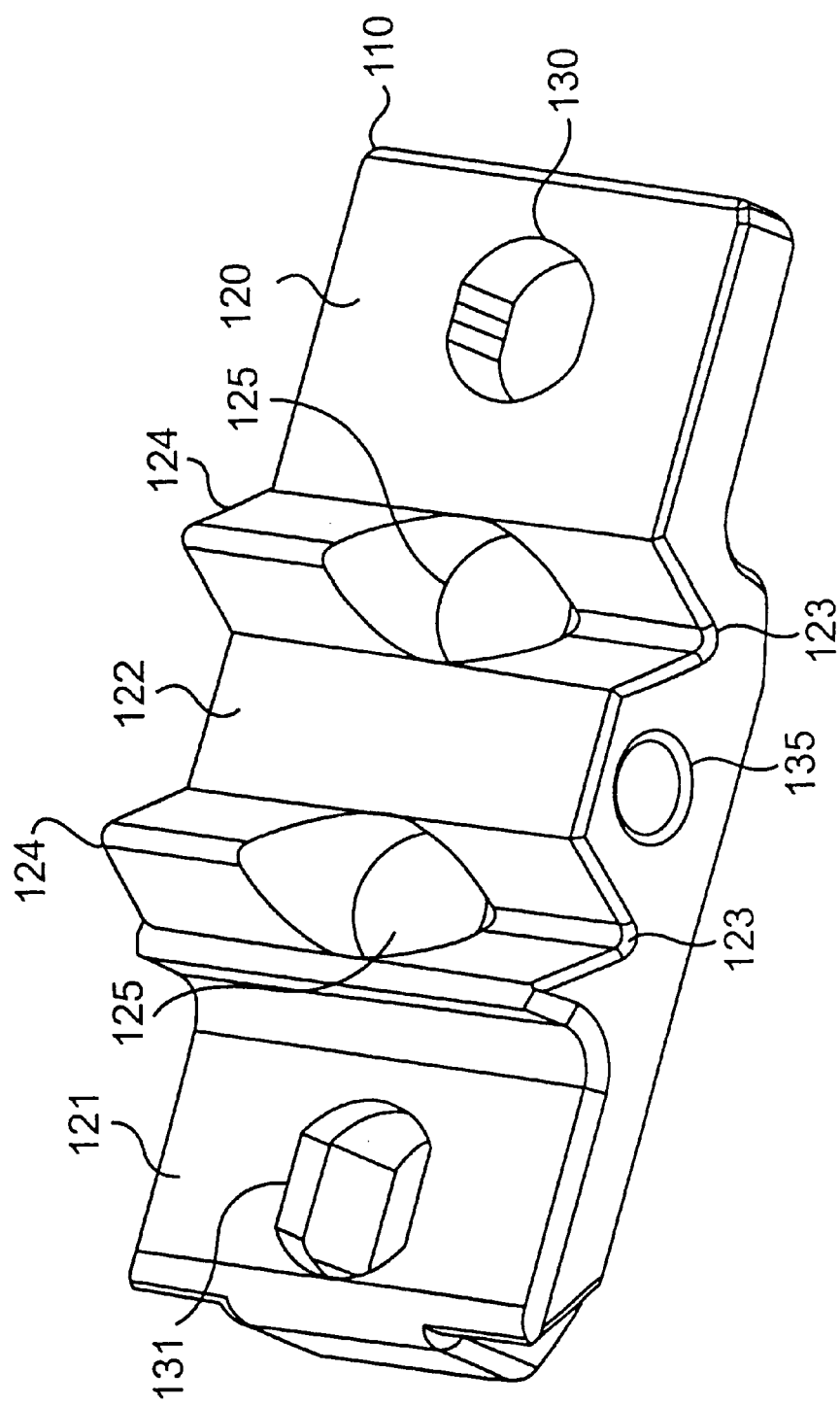
FIG. 12 is an axonometric view of the inner side of one of the first links of the embodiment of FIG. 9.
Figure 13:
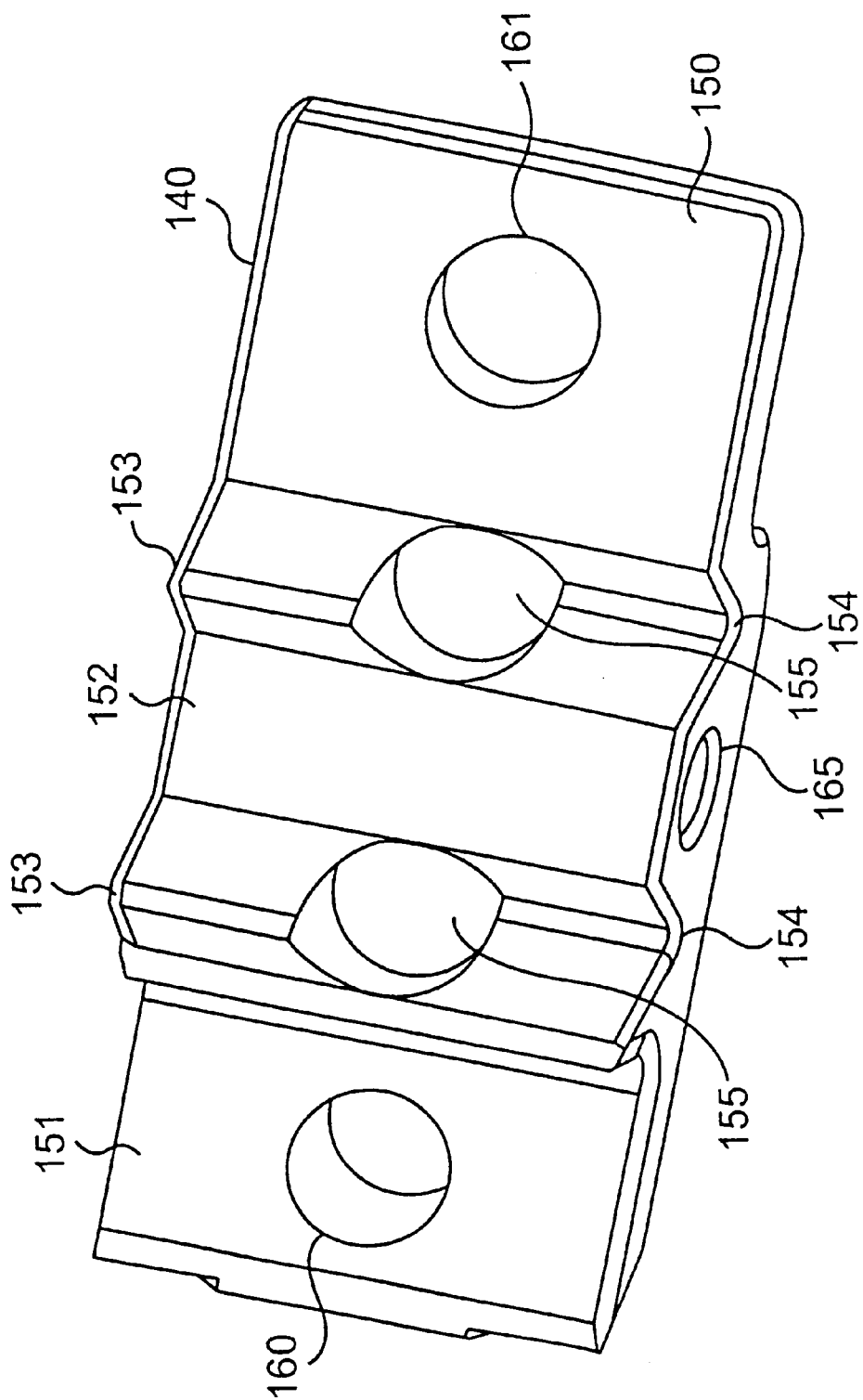
FIG. 13 is an axonometric view of the inner side of one of the second links of the embodiment of FIG. 9.

The inner sides of the first and second links 110 and 140 are shown in FIGS. 12 and 13, respectively. Each of the first links 110 has a first planar region 120 at its right end in FIG. 12, a second planar region 121 at its left end in the figure, and a third planar region 122 between the first and second planar regions 120 and 121. The first and third planar regions 120 and 122 are coplanar with respect to each other, while the second region 121 is disposed lower than the first and third planar regions 120 and 122. Similarly, each of the second links 140 has a first planar region 150 at its right end in FIG. 13, a second planar region 151 at its left end in the figure, and a third planar region 152 between the first and second planar regions 150 and 151. The first and third planar regions 150 and 152 are coplanar with respect to each other, while the second region 151 is disposed lower than the first and third planar regions 150 and 152.

Between the planar regions, the inner side of each link has a portion which is capable of overlapping a portion of the inner side of an opposing link in the widthwise direction of the spacer at least along the top side of the spacer 100. In the present embodiment, the overlapping portions are defined by a plurality of recesses and projections formed in opposing links, with each recess being capable of receiving a corresponding projection in an opposing link. The overlapping portions are not restricted to a particular shape, but in the present embodiment, they have a complementary shape so that opposing links can contact each other with no gap between them at their top sides. As shown in FIG. 12, a recess in the form of a triangular groove 123 is formed in the inner side of the first link 110 between the first and third planar regions 120 and 122, and recess in the form of another triangular groove 123 is formed in the inner side between the second and third planar regions 121 and 122. Each groove 123 extends in the height direction of the first link 110 (the direction between the top and bottom sides of the link) from the top side thereof. As shown in FIG. 13, a triangular projection 153 is formed in the inner side of the second link 140 between the first and third planar regions 150 and 152, and another triangular projection 153 is formed in the inner side between the second and third planar regions 151 and 152, with each projection 153 extending in the height direction of the second link 140 from the top side thereof. Each projection 153 in the second link 140 is similar in shape to and can be received in a corresponding one of the grooves 123 in each first link 110. The lengths of the grooves 123 and projections 153 in the height directions of the links 110 and 140 is not critical, for it is primarily the shape defined by the grooves 123 and projections 153 of the gap between the links along the top side of the links which is of interest. For example, the grooves 123 and projections 153 may extend for as little as a fraction of an inch in the height direction of the links. However, if the lengths of the grooves and projections 123 and 153 are extremely small, they may be difficult to form in the links, and the projections 153 may have a tendency to break. Thus, the grooves and projections 123 and 153 preferably extend sufficiently far to give them a desired strength. In the present embodiment the grooves and projections 123 and 153 extend for roughly ⅓ the height of the links.

The inner side of each of the first links 110 further includes two triangular projections 124 extending parallel to each other from the bottom side of the link 110 in the height direction of the link 110, with the apex of each projection 124 aligned with the bottom of one of the grooves 123. In a similar manner, the inner side of each of the second links 140 includes recesses in the form of two triangular grooves 154 extending parallel to each other from the bottom side of the link 140 in the height direction of the link 140, with the bottom of each groove 154 aligned with the apex of one of the projections 153. Each projection 124 in the first link 110 is similar in shape to and can be received in a corresponding one of the grooves 154 in the second link 140.

The projections and the grooves in the links need not be triangular. For example, they can be curved or have a non-triangular polygonal shape.

As in the previous embodiment, each link may include a hole 135 or 165 in its top side for use in mounting a partition or other equipment on the spacer 100. The holes 135 and 165 may extend partway or over the entire height of the links.

Adjoining links may be connected to each other in series in any desired manner, such as in the same manner shown in FIG. 7 with respect to the previous embodiment using connecting pins. Each of the first links 110 has two holes 130 and 131 formed at its opposite ends for receiving a connecting pin 170, and each of the second links 140 has two holes 160 and 161 formed at its opposite ends for receiving a connecting pin 170, which may be similar in structure to the connecting pin 60 of FIG. 7. As is the case with the embodiment of FIG. 7, the lower end of each connecting pin 170 is secured to hole 160 in one of the second links 140 and passes loosely through holes 161, 130, and 131 of other first or second links, with the head of the connecting pin 170 being received in an enlarged region of hole 131 of one of the first links 110 in the same manner as shown in FIG. 7. As with the previous embodiment, holes 161, 130, and 131 preferably receive the connecting pins 170 sufficiently loosely to permit adjoining links to pivot with respect to each other in a plane of the spacer 100 so that the spacer 100 can assume a curved shape. In addition, some of the holes (such as holes 130 and 131 in FIG. 12) may be elongated in the lengthwise direction of the links to enable the spacing (the overlap) between adjoining links to vary when the spacer 100 assumes a curved shape. As in the preceding embodiment, the links 110 and 140 can slide along the connecting pins 170 in the widthwise direction of the spacer 100 to adjust the width of the spacer 100. Although not shown in the figures, a connecting pin 170 may also be installed at the left end of the spacer 100. The right and left ends of the spacer 100 in FIG. 9 can either be connected to other members by connecting pins, bolts, or other hardware, or they can be left free. If the right end of the spacer 100 in FIG. 9 is left free without being connected to another member, a retaining device (such as a nut screwed onto the external threads of the connecting pin 170) can be attached to the lower end of the connecting pin 170 at the right end of the spacer 100 to prevent the second link 140 at the right end of the spacer 100 from becoming detached from the connecting pin 170.

Like the embodiment of FIG. 1, this embodiment preferably includes biasing members for urging the first and second links 110 and 140 away from each other in the widthwise direction of the spacer 100. The biasing members are not restricted to any particular structure. For example, they may have any of the forms described with respect to the preceding embodiment. In this embodiment, the biasing members comprise helical compression springs (not visible in the drawings) disposed between opposing links. Each spring has a first end received in one of two recesses 125 formed in the inner side of one of the first links 110 and a second end received in one of two recesses 155 formed in the inner side of one of the second links 140. Each recess 125 and 155 is formed between a groove 123 or 154 in the link and the projection 124 or 153 aligned with the groove, with the bottom surface of the recess 125 or 155 being disposed below the apex of the projection and above the bottom of the groove between which it is formed. In this embodiment, each link is equipped with two springs, but a larger or smaller number of springs may instead be employed.

Figure 11:
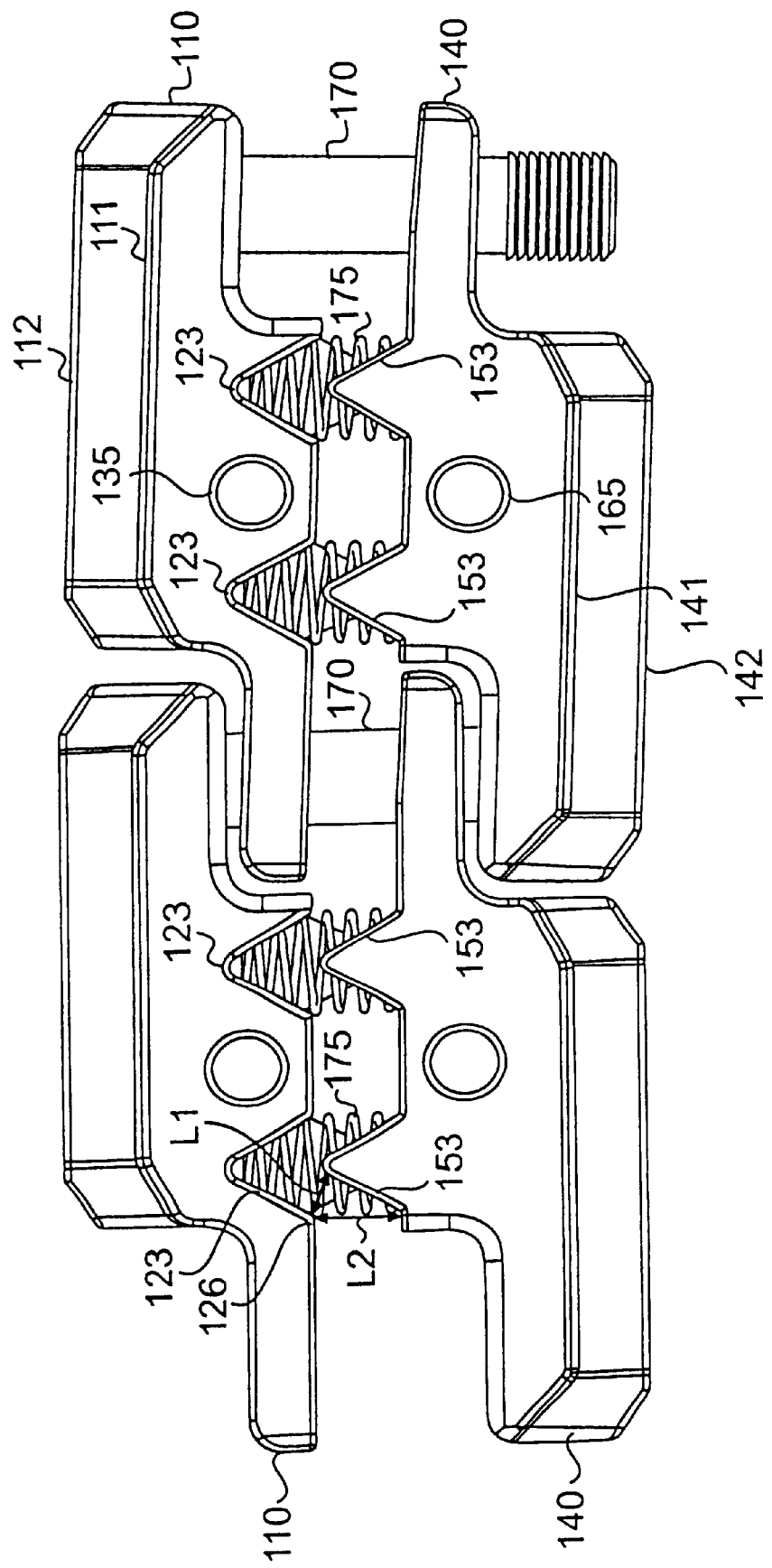
FIG. 11 is a plan view of the embodiment of FIG. 9 in an expanded state.

FIG. 11 is a plan view of the spacer 100 in an expanded state. It can be seen that the projections and grooves in the inner sides of the links give the centerline of the gap between opposing links a zigzag shape, as opposed to the centerline of the gap of the embodiment of FIG. 2 which extends in a straight line in the lengthwise direction of the spacer 10. In the embodiment of FIG. 2, the minimum distance between two opposing links 10, 20 on opposite widthwise sides of the spacer 10 is equal to the widthwise separation between the links. In contrast, in the present embodiment, the minimum distance between opposing links 110, 140 can be less than the widthwise separation between the links. For example, the distance L1 in FIG. 11 between point 126 on one of the first links 110 and the opposing second link 140 is less than the widthwise separation L2 between the two links 110, 140. If the widthwise separation between opposing links 10, 20 in FIG. 2 were L2, a sphere having a diameter L2 could enter into the gap between two opposing links anywhere along the lengths of the links. In contrast, in the embodiment of FIG. 11, the same sphere of diameter L2 could not fall into the gap between opposing links 110, 140 in those regions (such as in the region including point 126) in which the minimum distance between opposing links is less than the widthwise separation L2 between them. Accordingly, objects are less likely to fall into or become caught in the gap between links 110, 140 when being transported across the spacer 100 of FIG. 11 than with the spacer 10 of FIG. 2.

Opposing links in this embodiment have a complementary shape not only along the top side of the spacer 100 but also along the bottom side. Since only the top side of the spacer 100 is normally contacted by objects being transferred across the spacer 100, the shape of the gap between opposing links on the bottom side of the spacer 100 does not influence the transfer of objects across the spacer 100, so the gap on the bottom side of the spacer 100 may have a shape which is different from that along the top side. However, forming opposing links so as to have a complementary shape on both the top and bottom sides of the spacer 100 is advantageous because it enables the spacer 100 to be used with either the top side or the bottom side of the spacer 100 facing up.

In this embodiment, each groove and projection extends only partway over the height of a link, but it is possible for a groove or projection to extend across the entire height of a link between its top and bottom sides. Instead of each link having two grooves and two projections, a link may have one groove and one projection, or some of the links may have only grooves formed therein while the remaining links have only projections formed therein for engagement with the grooves. It is also possible to employ a larger or smaller number of grooves and projections than shown in the drawings. For example, a link may have a single projection and no groove, or a single groove and no projection.

As in the embodiment of FIG. 1, the first and second links 110 and 140 are preferably shaped so that when the spacer 100 is installed between two conveyor belts 70 and 75 in the manner shown in FIG. 8, the outer edge of the top side of each second link 140 (corresponding to edge 56 in FIG. 8) is slightly lower than the lefthand edge 77 of the adjoining conveyor belt 75, the outer edge of the top side of each first link 110 (corresponding to edge 37) is slightly higher than the righthand edge 72 of the adjoining conveyor belt 70, and the inner edge of the top side of each second link 140 (corresponding to edge 57) is slightly higher than the inner edge of the top side of the opposing first link 110 (corresponding to edge 36). For example, the top sides of the first and second links 110 and 140 can slope upwards from right to left in the same manner as shown in FIG. 8 with respect to the links 20 and 40 of the embodiment of FIG. 1.

If the spacer 100 of FIG. 9 is installed in a gap between two moving components of a conveying apparatus, such as between two conveyor belts moving in opposite directions, the spacer 100 is preferably oriented such that the conveyor belt adjoining the first links 110 moves with respect to the spacer 100 in the direction of arrow 180 and the conveyor belt adjoining the second links 140 moves with respect to the spacer 100 in the direction of arrow 181 in FIG. 9. With this orientation of the spacer 100, the left end of each first link 110 is an upstream end and the right end of each first link 110 is a downstream end of the link 110 with respect to the conveyor belt moving in the direction of arrow 180, and the right end of each second link 140 is an upstream end and the left end of each second link 140 is a downstream end of the link 140 with respect to the conveyor belt moving in the direction of arrow 181. The overlap between adjoining first or second links 110, 110 or 140, 140 in the lengthwise direction of the spacer 100 is preferably such that the upstream end of each link is covered by the downstream end of the adjoining link on its upstream side, i.e., the downstream end of the upstream link is located on the outside of the upstream end of the downstream link. For example, in FIG. 9, the upstream end of the righthand of the two first links 110 is covered by the downstream end of the lefthand of the two first links 110, and the upstream end of the left hand of the two second links 140 is covered by the downstream end of the righthand of the two second links 140. Disposing the downstream end of a link on the outside of the upstream end of an adjoining link prevents the upstream end of a link from catching on the widthwise edge of the adjoining conveyor belt if the connecting pin 170 connecting the two links should break or come loose, thereby avoiding possible damage to the spacer 100 or to the conveyor belt.

Figure 14:
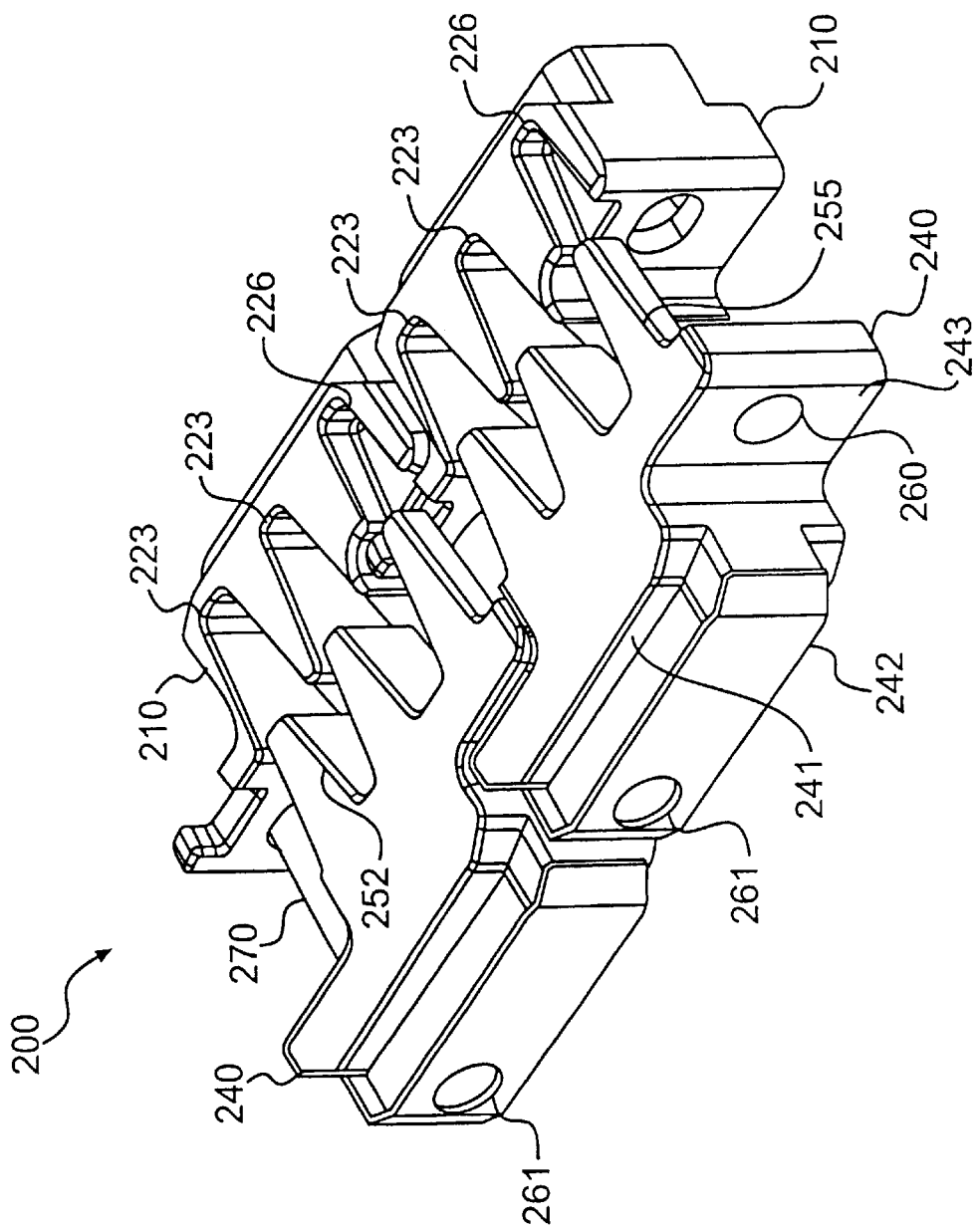
FIG. 14 is an axonometric view of another embodiment of a variable-width spacer according to the present invention in an expanded state.
Figure 15:
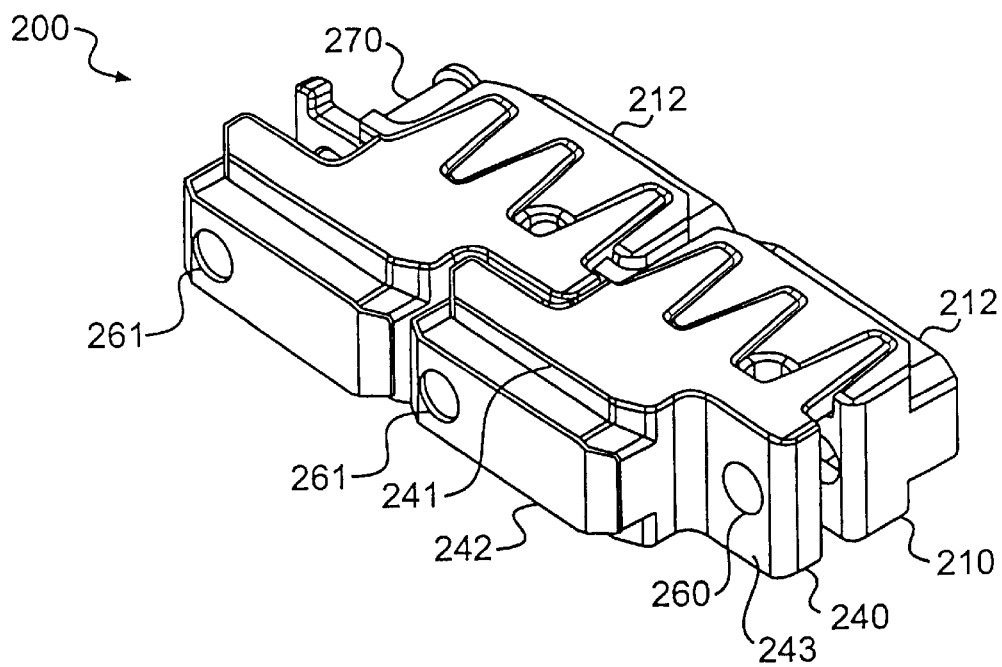
FIG. 15 is an axonometric view of the embodiment of FIG. 14 in a contracted state.
Figure 17:
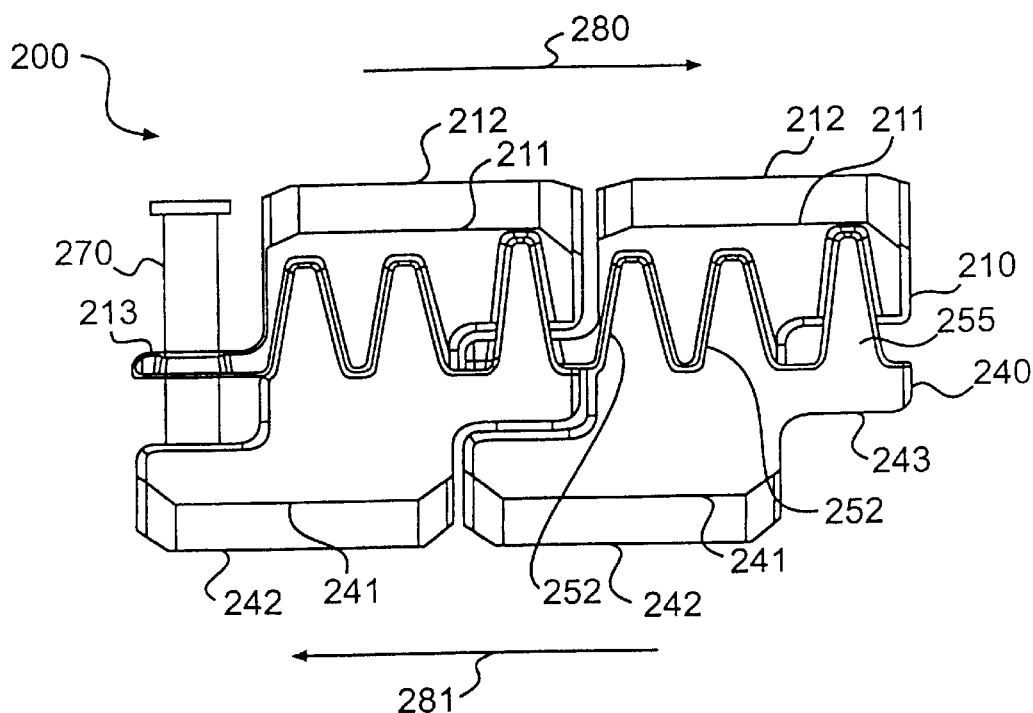
FIG. 17 is a plan view of the embodiment of FIG. 14 in a contracted state.
Figure 16:
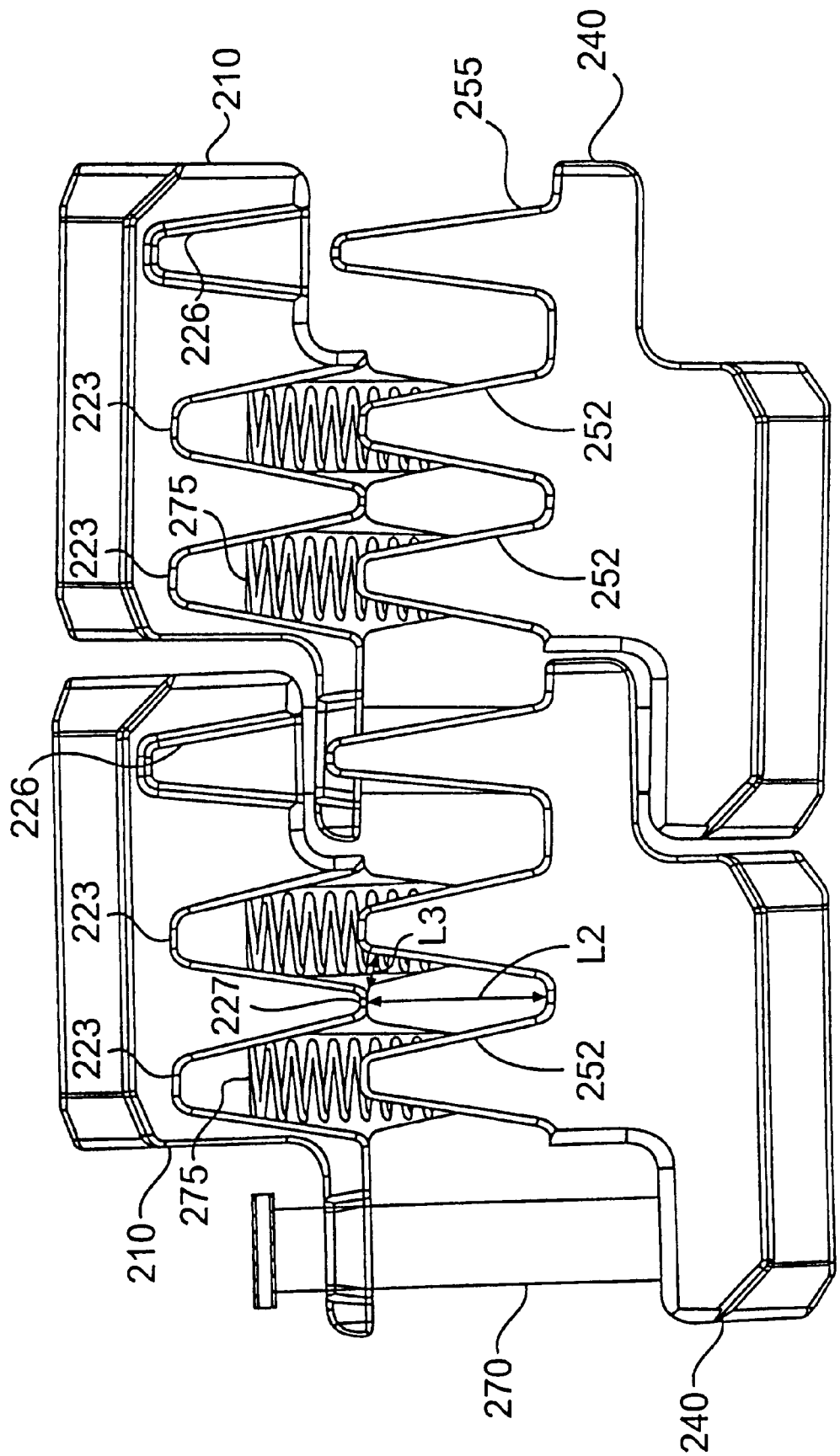
FIG. 16 is a plan view of the embodiment of FIG. 14 in a expanded state.

FIGS. 14–19 illustrate another embodiment of a variable-width spacer 200 according to the present invention. The overall structure of the embodiment is similar to that of the embodiment of FIGS. 9–13, but it has a larger number of overlapping portions defined by grooves and projection. This embodiment includes a plurality of first links 210 and a plurality of second links 240 connected in series on opposite widthwise sides of the spacer 200. Each link has a top side (the side facing upwards in FIG. 14) which normally faces upwards during use of the spacer 200 and supports objects being transported across the spacer 200, a bottom side which normally faces downwards, an inner side which faces the links on the opposite widthwise side of the spacer 200, and an outer side which faces away from the opposite widthwise side and towards an adjoining component of a conveying apparatus in which the spacer 200 is installed. Adjoining links are connected to each other by connecting pins 270 in the same manner as in the embodiment of FIG. 9, and opposing first and second links 210 and 240 are urged away from each other by helical compression springs 275 or other suitable biasing members, such as those described with respect to the preceding embodiments only two connecting pins 270 are visible in these drawings (at the left end and the middle of the spacer 200), but a connecting pin 270 may also be installed at the right end of the spacer 200. The first and second links 210 and 240 can move with respect to each other in the widthwise direction of the spacer 200 to adjust the width of the spacer 200. FIGS. 14 and 16 show the spacer 200 in an expanded state with a maximum widthwise separation between opposing links 210 and 240, and FIGS. 15 and 17 show the spacer 200 in a contracted state with the links moved towards each other until the separation between opposing links is a minimum and the opposing links are contacting each other. As is the case with the preceding embodiments, the spacer 200 may include one or a plurality of each type of link 210 and 240.

The outer sides of the first and second links 210 and 240 may be similar in shape to those of the first and second links 110 and 140 of the embodiment of FIG. 9. The outer sides of the first links 210 include two bearing surfaces 211 adjoining the top and bottom sides of the link 210 and a projection 212 disposed between and projecting from the bearing surfaces 211. The outer sides of the second links 240 similarly include two bearing surfaces 241 adjoining the top and bottom sides of the link 240 and a projection 242 disposed between and projecting from the bearing surfaces 241. The spacer 200 can be installed in a gap between two conveyor belts 70 and 75 in the manner shown in FIG. 8 with respect to the spacer 10 of FIG. 1, with each projection 212 and 242 slidably received in a groove 71 and 76 of one of the conveyor belts and with the bearing surfaces 211 and 241 disposed outside the grooves 71 and 76 and opposing the widthwise edge surfaces of the conveyor belts 70 and 75. The projections 212 and 242 extend for only a portion of the lengths of the links. The outer side of each first link 210 has a region of reduced thickness at its left end in FIG. 17 to define a ledge 213 adjoining projection 212 and separated therefrom by a step, and the outer side of each second link 240 has a region of reduced thickness at its right end in FIG. 17 to define a ledge 243 adjoining projection 242 and separated therefrom by a step. A hole 230 for slidably receiving a connecting pin 270 is formed in the ledge 213 of each first link 210, and a cutout 221 for slidably receiving a projection of one of the second links 240 is formed in the edge of the ledge 213 adjoining the top side of the link 210. At the opposite end of the first link 210, a hole 231 extending between the inner and outer sides of the link 210 is formed for slidably receiving the head of a connecting pin 270 in the same manner as hole 131 of the embodiment of FIG. 9. A hole 260 for slidably receiving a connecting pin 270 is formed through the ledge 243 of each of the second links 240, and a hole 261 in which the lower end of a connecting pin 270 can be secured is formed in the projection 242 at the left end of each second link 240.

Figure 18:
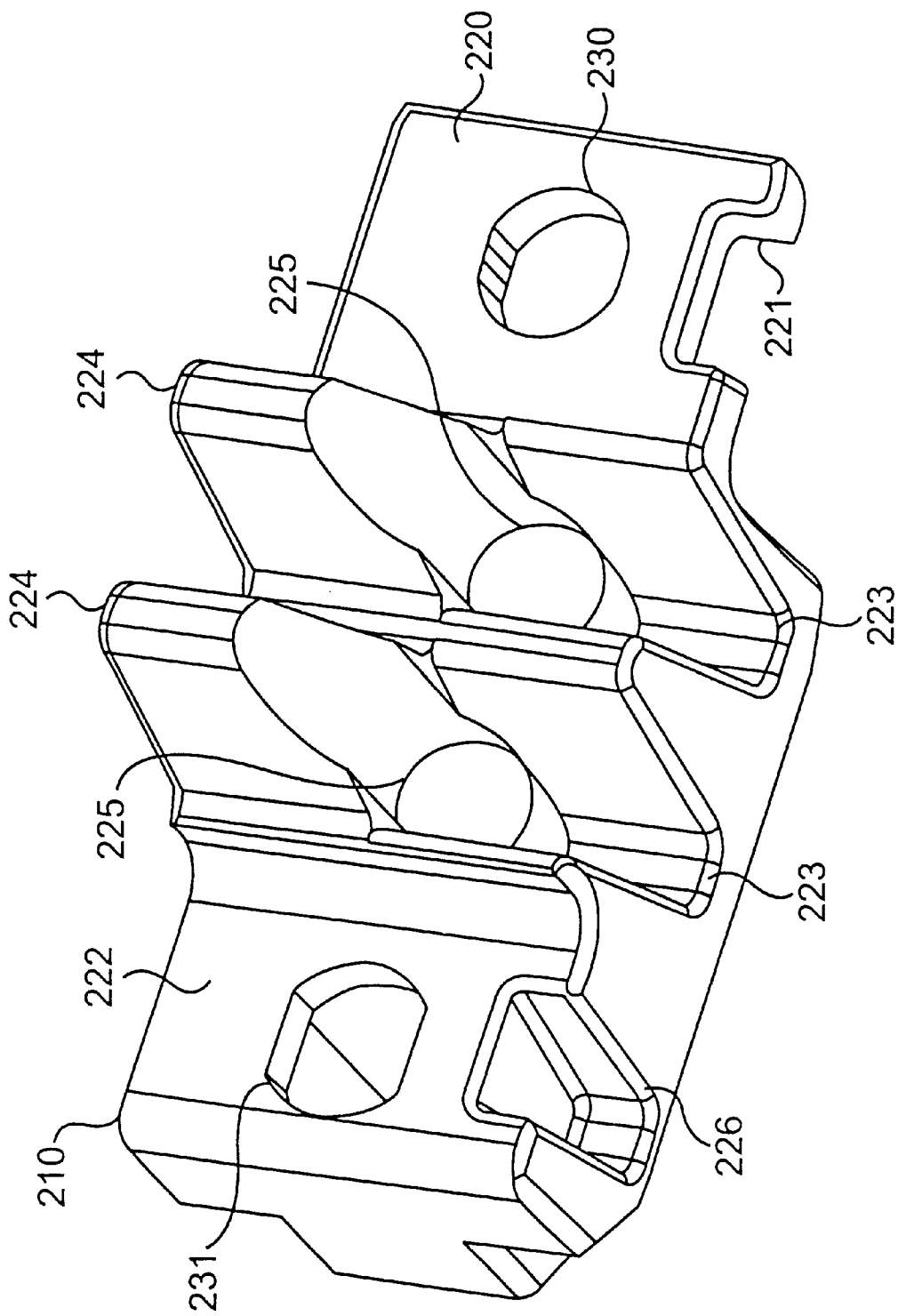
FIG. 18 is an axonometric view of the inner side of one of the first links of the embodiment of FIG. 14.

FIG. 18 illustrates the inner side of one of the first links 210. At its opposite lengthwise ends, it includes first and second substantially planar regions 220 and 222 through which pass holes 230 and 231, respectively. The second region 222 is lower than the first region 220 by at least the thickness of the first link 210 at the ledge 213 so as to be able to receive the ledge 213 of an adjoining one of the first links 210. Between the two planar regions 220 and 222, the first link 210 includes two parallel grooves 223 and two parallel projections 224 each aligned with one of the grooves 223, the grooves 223 and projections 224 corresponding to those of the first link 110 of the embodiment of FIG. 9. Each of the grooves 223 extends in the height direction of the first link 210 from the top side of the link 210, and each of the projections 224 extends in the height direction of the link 210 from the bottom side thereof. Between each groove 223 and the aligned projection 224, a recess 225 for receiving one end of a helical compression spring 275 is formed. At the left end of the first link 210 in FIG. 18, an additional groove 226 extends in the height direction of the link 210 from its top side. The bottom of this groove 226 is closer to the outer side of the first link 210 than are the bottoms of the other two grooves 223 to help break up continuous gaps in the top side of the spacer, but the relative depths of the grooves 223 and 226 are not critical. Groove 226 is shallower in the height direction of the link 210 than the other grooves 223 so as not to intersect the hole 231 in the second planar region 222. In contrast to the other grooves 223, this groove 226 does not have a projection aligned with it adjoining the bottom side of the link 210, but such a projection may be provided, if desired.

Figure 19:
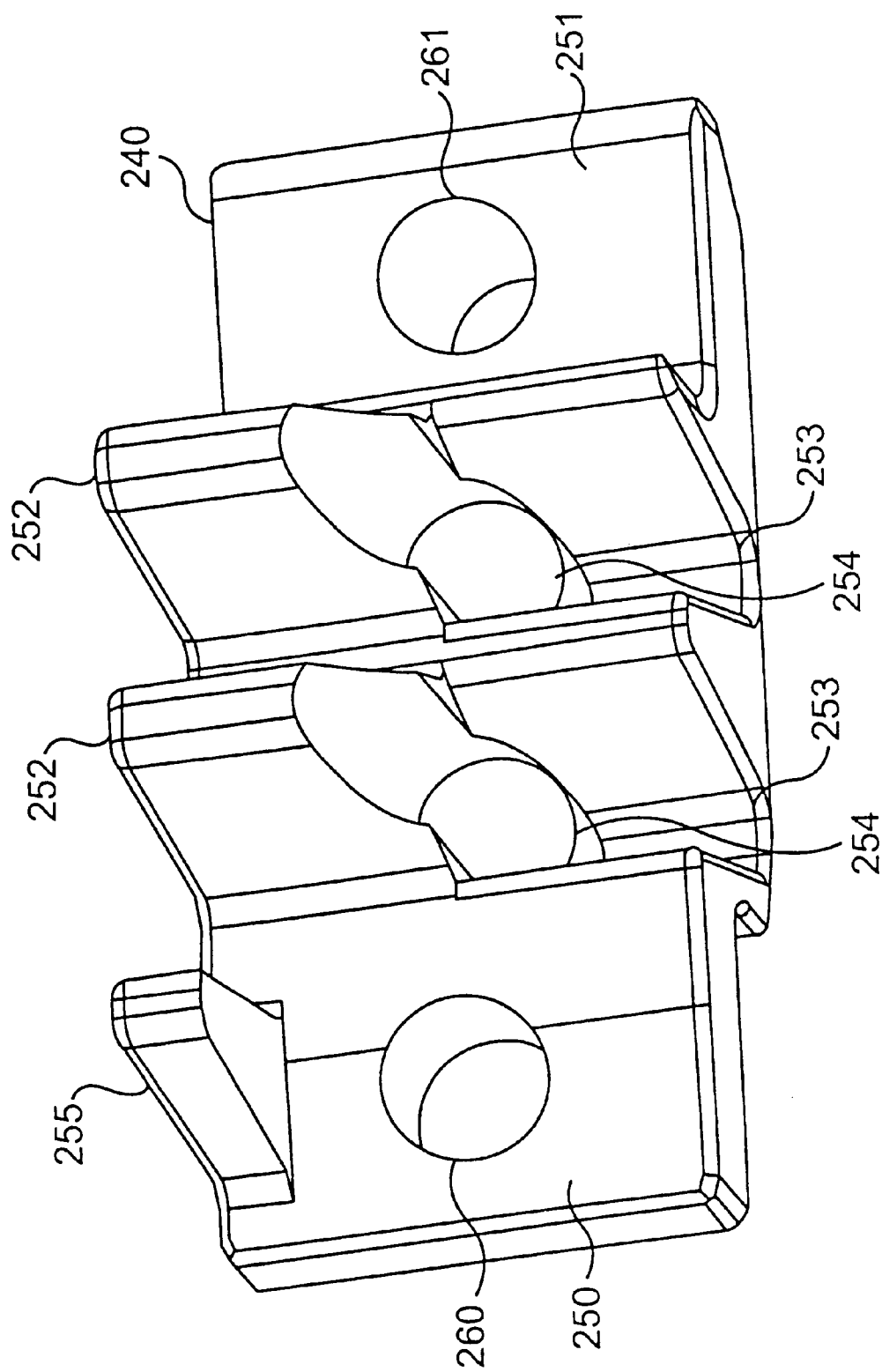
FIG. 19 is an axonometric view of the inner side of one of the second links of the embodiment of FIG. 14.

FIG. 19 illustrates the inner side of one of the second links 240. At its opposite lengthwise ends, it includes first and second substantially planar regions 250 and 251 through which pass holes 260 and 261, respectively. The second region 251 is lower than the first region 250 by at least the thickness of the second link 240 at the ledge 243 so as to be able to receive the ledge 243 of an adjoining one of the second links 240. Between the two planar regions 250 and 251, the second link 240 includes two parallel projections 252 and two parallel grooves 253 each aligned with one of the projections 252, the projections 252 and grooves 253 corresponding to those of the second link 140 of the embodiment of FIG. 9. Each of the projections 252 extends in the height direction of the second link 240 from the top side of the link 240, and each of the grooves 253 extends in the height direction of the link 240 from the bottom side thereof. The spacing between adjoining grooves 253 and adjoining projections 252 is the same as that of the grooves 223 and projections 224 of the first links 210. Furthermore, the grooves and projections of both links 210 and 240 are sized such that each groove of one link can receive one of the projections of the opposing link. Between each projection 252 and the aligned projection 253, a recess 254 is formed for receiving one end of one of the helical compression springs 275. At the left end of the second link 240 in FIG. 19, an additional projection 255 extends in the height direction of the link 250 from its top side. This projection 255 has dimensions such that it can be received in groove 226 in the opposing first link 210. The cutout 221 in the ledge 213 of each of the first links 210 is sufficiently wide that the projection 255 of one of the second links 240 can freely translate in the cutout 221 in the widthwise direction of the spacer 200.

In the contracted state shown in FIGS. 15 and 17, the top of each projection 252 and 255 of the second link 240 is shown contacting the bottom of one of the grooves 223 and 226 in the opposing first link 210, and each projection contacts the opposing groove over substantially the entire surface of the projection and the groove. However, it is possible for there to be a space between a projection and the corresponding groove in this state.

As best shown in FIG. 16, which is a plan view of the spacer 200 in an expanded state, the projections and grooves in the inner sides of the links give the centerline of the gap between opposing links a zigzag shape along the top side of the spacer, as in the embodiment of FIG. 11. Furthermore, in many regions of the spacer 200, the minimum distance between two opposing links 210, 240 on opposite widthwise sides of the spacer 200 at the top side is less than the widthwise separation between the links. For example, the distance L3 between point 227 on one of the first links 210 and the opposing second link 240 is significantly less than the widthwise separation L2 between the two links 210, 240. In fact, over the entire lengthwise region in which the grooves 223, 226 and projections 252, 255 and are present on the top side of the spacer 200, in the fully expanded state of the spacer 200, the minimum distance between any point on one link and the opposing link is less than the widthwise separation between the two links 210, 240. Comparing the embodiment of FIG. 16 with the embodiment of FIG. 11, it can be seen that in the embodiment of FIG. 16, the gap between opposing links has more changes in direction, and if the widthwise separation between opposing links is the same in both embodiments, the minimum distance between opposing links in an expanded state of the spacer is on average smaller than for the embodiment of FIG. 11. As a result, there is a smaller likelihood of objects being caught in the gap between opposing links of the embodiment of FIG. 16 as the objects cross the spacer 200, so this embodiment can be used with a wider variety of objects.

In this embodiment, the gap between opposing first and second links 210 and 240 does not have the same shape on the top and bottom sides of the spacer 200, since each link has a larger number of grooves or projections on its top side than on its bottom side. In fact, grooves and projections adjoining the bottom sides of the links may be omitted. However, forming the first and second links 210 and 240 so that they have a complementary shape at the bottom side as well as at the top side enables the spacer 200 to function more effectively in the event it is desired to invert the spacer 200 and have the top side facing downwards.

When the spacer 200 is installed between two conveyor belts 70 and 75 such as in the manner shown in FIG. 8, preferably the outer edge of the top side of each second link 240 (corresponding to edge 56 in FIG. 8) is slightly lower than the lefthand edge 77 of the adjoining conveyor belt 75, the outer edge of the top side of each first link 210 (corresponding to edge 37) is slightly higher than the righthand edge 72 of the adjoining conveyor belt 70, and the inner edge of the top side of each second link 240 (corresponding to edge 57) is slightly higher than the inner edge of the top side of the opposing first link 210 (corresponding to edge 36). For example, the top sides of the first and second links 210 and 240 can slope upwards from right to left in the same manner as shown in FIG. 8 with respect to the links 20 and 40 of the embodiment of FIG. 1.

As with the embodiment of FIG. 9, when the spacer 200 of FIG. 14 is installed in a gap between two conveyor belts or other components moving in opposite directions, the spacer 200 is preferably oriented such that the upstream end of each link is covered by, i.e., disposed inwards of the downstream end of the link adjoining it on its upstream side. For example, if the spacer 200 of FIG. 17 is installed between a first conveyor belt adjoining the first links 210 and moving in the direction of arrow 280 and a second conveyor belt adjoining the second links 240 and moving in the direction of arrow 281, the upstream end (the left end) of each of the first links 210 is covered by the downstream end (the right end) of the first link 210 adjoining it on its upstream side (its left side), and the upstream end (the right end) of each of the second links 240 is covered by the downstream end (the left end) of the second link 240 adjoining it on its upstream side (its right side), thereby preventing the upstream ends of the links from catching on the conveyor belts in the event that the links become detached from the connecting pins 270.

Figure 20:
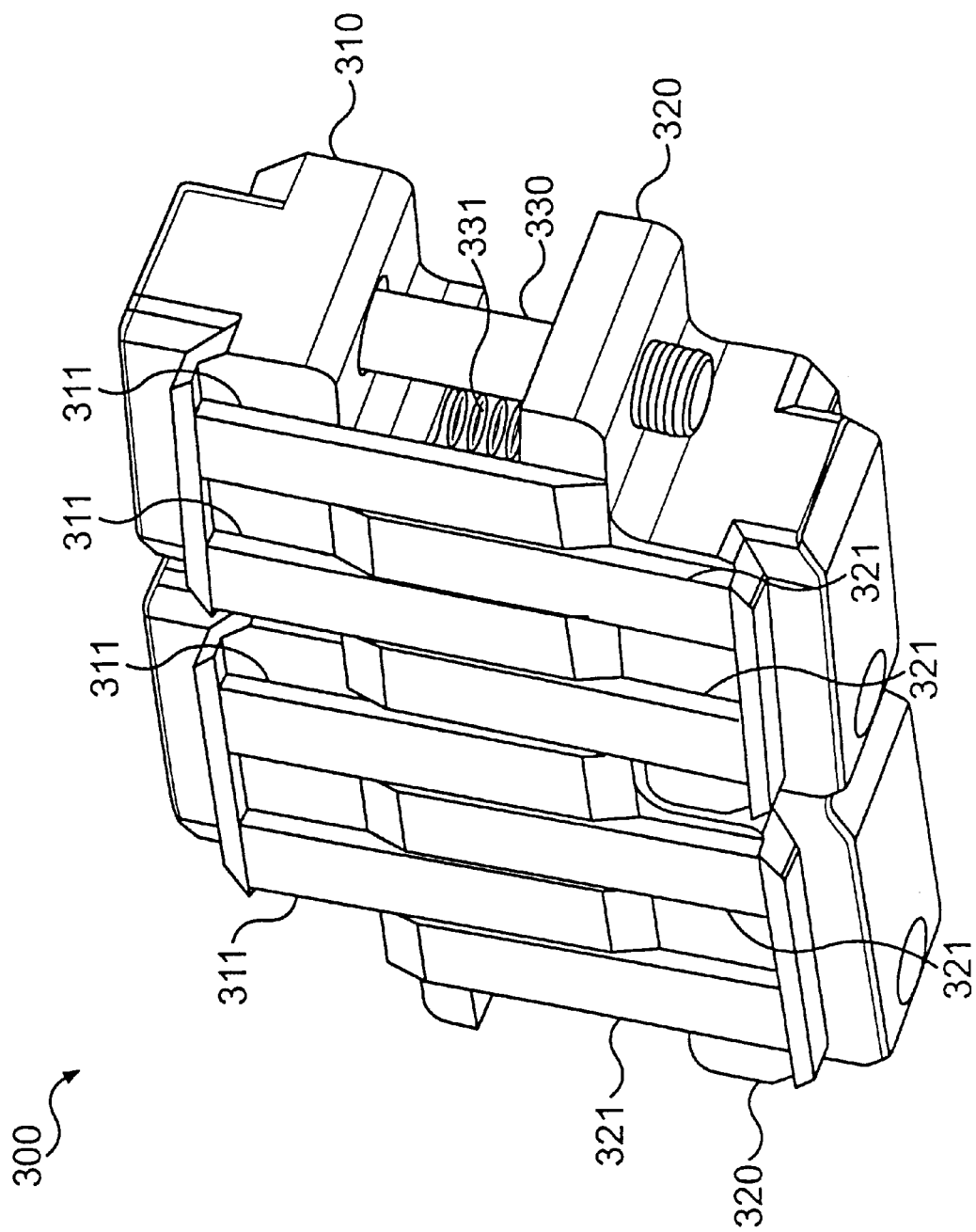
FIG. 20 is an axonometric view of another embodiment of a variable-width spacer according to the present invention.
Figure 21:
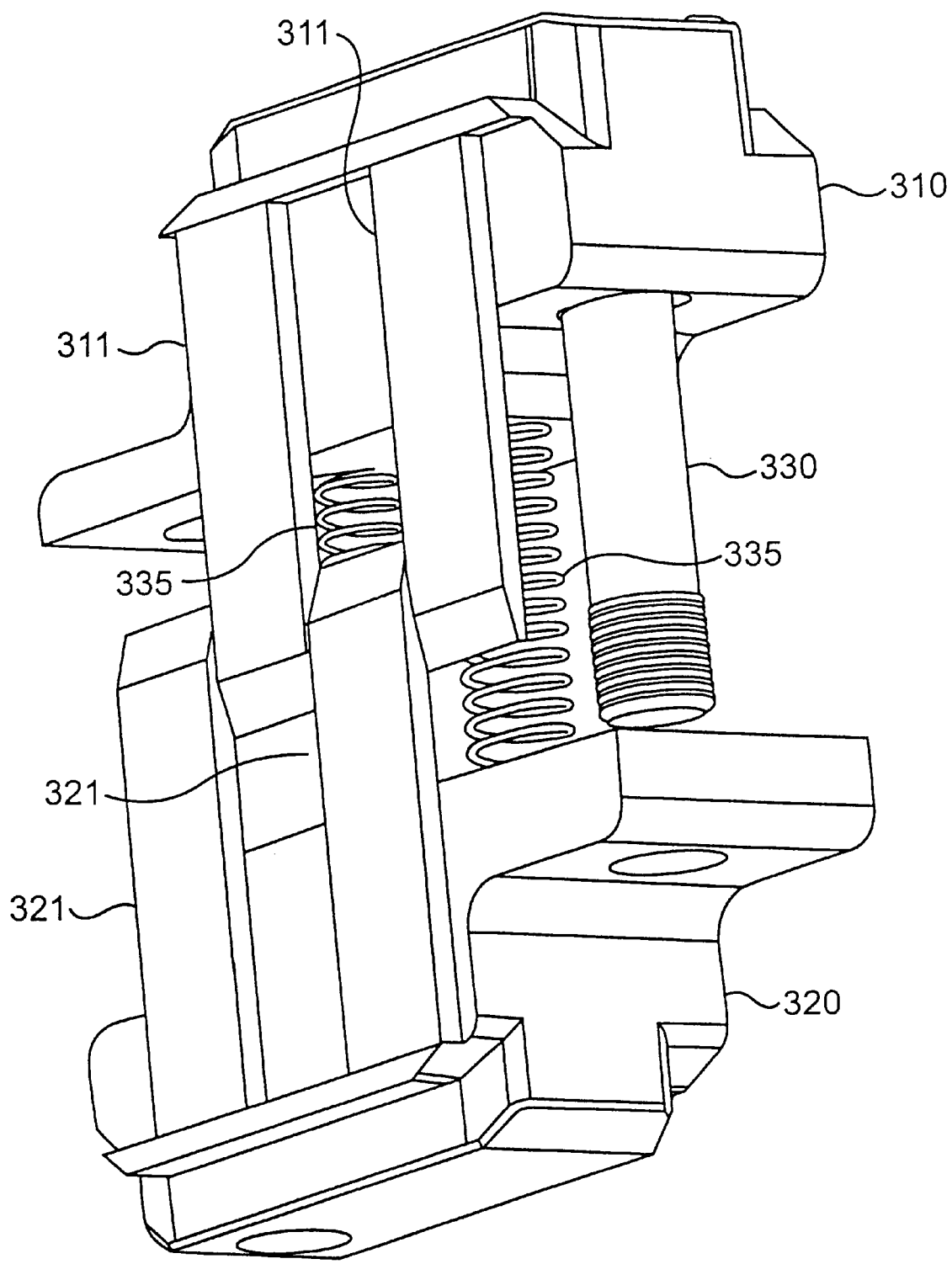
FIG. 21 is an exploded axonometric view of two of the links of FIG. 20.

FIGS. 20 and 21 illustrate another embodiment of a variable-width spacer 300 according to the present invention. This embodiment is similar in overall structure to the embodiment of FIG. 1, but the links of that embodiment have been modified such that each link at all times overlaps an opposing link of the spacer 300 in the widthwise direction of the spacer 300. The spacer 300 includes a plurality of first links 310 connected in series on one widthwise sides of the spacer 300 and a plurality of second links 320 connected in series on an opposite widthwise side of the spacer 300 from the first links 310. Adjoining links 310, 310 and 320, 320 are connected with each other by connecting pins 330 in the same manner as in the embodiment of FIG. 1 so as to permit opposing links 310 and 320 to move with respect to each other in the widthwise direction of the spacer 300 to adjust the width of the spacer 300 and so as to permit adjoining links to pivot with respect to each other in the plane of the spacer 300 so that the spacer 300 can assume a curved shape. The first and second links 310 and 320 may be equipped with biasing members (such as helical compression springs 335) as in the preceding embodiments to urge opposing links away from each other in the widthwise direction of the spacer 300. The inner and outer sides of the first and second links 310 and 320 may have the same shapes as those of the corresponding first and second links 20 and 40 of the embodiment of FIG. 1, so a description of the shapes of those portions will be omitted.

On its top side, each of the first links 310 includes one or more elongated fingers 311 extending in the widthwise direction of the spacer 300 towards the second links 320, and each of the second links 320 includes one or more elongated fingers 321 extending in the widthwise direction of the spacer 300 towards the first links 310. The fingers 311 or 321 on each link slidably interfit with the fingers on the opposing first or second link. The fingers 311 and 321 are preferably sufficiently long to completely cover any gaps which form between opposing links 310 and 320 beneath the undersurface of each finger 311 and 321 at the maximum widthwise separation between the first and second links 310 and 320 permitted by the connecting pins 330 connecting the links. An object which is transferred across the spacer 300 in the widthwise direction of the spacer 300 is supported by the fingers 311 and 321 while passing across the gaps beneath the fingers. This embodiment employs two fingers 311 and 321 on each of the first and second links 310 and 320, but it is also possible to provide fingers only on some of the links. For example, fingers can be provided on only the first links 310 but not on the second links 320 or vice versa, or some but not all of the first links 310 and some but not all of the second links 320 can be provided with fingers. For example, each of the first links 310 may be provided with a single broad finger having a breadth (measured in the lengthwise direction of the spacer 300) equal to the breadth of four of the fingers 311 and 321 of FIG. 20 and overlapping the opposing second link 320 in the widthwise direction of the spacer 300. The structure of this embodiment may be otherwise the same as that of the embodiment of FIG. 1.

The links of any of the embodiments of the present invention can be made of any materials having the desired strength, wear resistance, or other physical properties suitable to meet the demands of the conveying apparatus in which the spacer 300 is used. For example, they can be made of metals, plastics, and composites of different materials.

Figure 22:
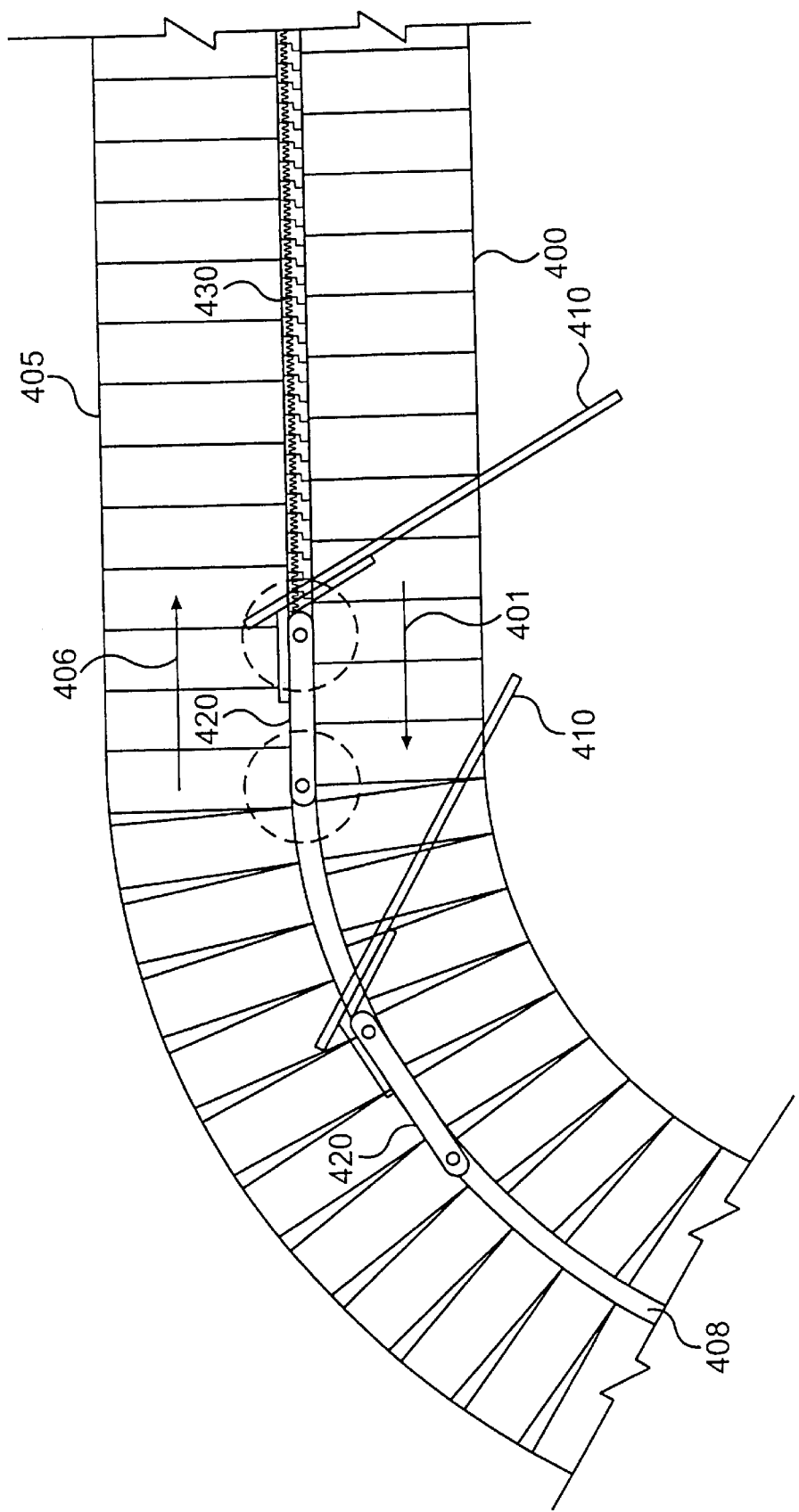
FIG. 22 is a plan view of a portion of a conveying apparatus employing a variable-width spacer according to the present invention.
Figure 23:
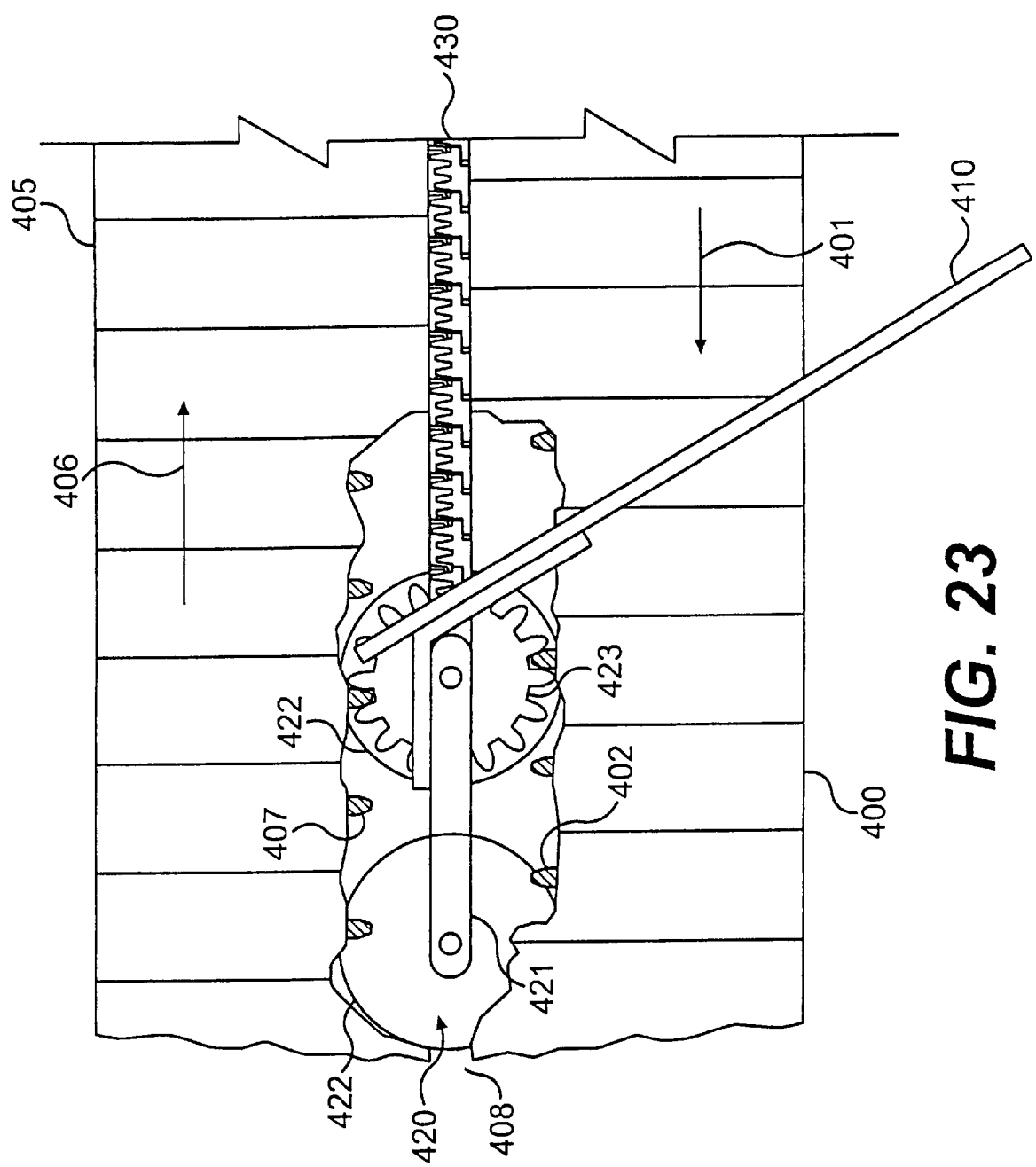
FIG. 23 is an enlarged cutaway plan view of a portion of the conveying apparatus shown in FIG. 22.

As mentioned above, one possible application of a spacer according to the present invention is to fill a gap between two conveyor belts moving parallel to each other. FIGS. 22 and 23 illustrate a variable-width spacer 430 according to the present invention installed in a gap between two conveyor belts 400, 405 of a commercially available variable-volume accumulator, such as a DYNAC-brand accumulator manufactured by Hartness International of Greenville, S.C. The illustrated spacer 430 has the same structure as the embodiment of FIG. 14 but includes a larger number of links connected in series. Any of the other embodiments of spacers according to the present invention may be installed in an accumulator in a similar manner. The illustrated accumulator includes an infeed conveyor belt 400 and an outfeed conveyor belt 405 disposed parallel to the infeed conveyor belt 400 and separated therefrom by a gap 408. The two conveyor belts move in opposite directions from each other, with the infeed conveyor belt 400 carrying objects away from an unillustrated main conveyor line (such as a main conveyor belt of a manufacturing line) in the direction of arrow 401, and with the outfeed conveyor belt 405 returning objects to the main conveyor line in the direction of arrow 406. The accumulator provides temporary storage of objects being processed on the main conveyor line and returns the objects to the main conveyor line as the objects are needed on the main conveyor line downstream of the accumulator.

Objects can be transferred between the infeed conveyor belt 400 to the outfeed conveyor belt 405 by a vertical transfer plate 410 beneath which the two conveyor belts pass and which extends diagonally with respect to the direction of movement of the infeed conveyor belt 400. When an object being carried by the infeed conveyor belt 400 comes into contact with the transfer plate 410, the object is guided along the length of the transfer plate 410 towards the outfeed conveyor belt 405 by the force exerted on the object by the infeed conveyor belt 400, and when the object reaches the outfeed conveyor belt 405, the object is carried by the outfeed conveyor belt 405 back towards the main conveyor line.

The location of the transfer plate 410 in the lengthwise direction of the two conveyor belts can be adjusted by a position adjusting mechanism 420 such as that shown in FIG. 23. The transfer plate 410 is secured to a vertical support plate 421 which is supported by two horizontal guide wheels 422 rotatably connected to the bottom of the support plate 421, each wheel 422 having a circumferential groove engaging with a pair of unillustrated horizontal guide rails extending beneath the conveyor belts in the lengthwise direction thereof. A pinion 423 is rotatably mounted on the bottom of the support plate 421 concentrically with one of the guide wheels 422 beneath the conveyor belts 400 and 405, and a series of teeth 402 and 407 are formed on the undersides of the conveyor belts 400 and 405 for engagement with the pinion 423.

When the two conveyor belts 400 and 405 are moving in opposite directions from each other at the same speed, the position adjusting mechanism 420 and the transfer plate 410 will remain stationary. However, if one of the conveyor belts is moving faster than the other one, the position adjusting mechanism 420 will be moved along the conveyor belts in the direction of movement of the faster moving conveyor belt so as to maintain the tangential speeds of the two conveyor belts with respect to the pinion 423 the same for both conveyor belts.

For example, if the infeed conveyor belt 400 is moving faster than the outfeed conveyor belt 405, the transfer plate 410 will be moved to the left in FIG. 23, and if the outfeed conveyor belt 405 is moving faster than the infeed conveyor belt 400, the transfer plate 410 will be moved to the right in the figure. Movement of the transfer plate 410 to the left increases the capacity of the accumulator, i.e., increases the number of objects which can be present on the accumulator at a given time by increasing the distance measured along the conveyor belts between the transfer plate 410 and the main conveyor line, and movement of the transfer plate 410 to the right decreases its capacity. When it is desired to increase the capacity of the accumulator, the infeed conveyor belt 400 is driven faster than the outfeed conveyor belt 405, and when it is desired to decrease the capacity of the accumulator, the outfeed conveyor belt 405 is driven faster than the infeed conveyor belt 400. The speeds of the conveyor belts 400 and 405 can be controlled using known technology and known algorithms based on various parameters, such as the demand for objects by equipment located along the main conveyor line downstream of the accumulator.

The spacer 430 is disposed in the gap 408 between the two conveyor belts 400 and 405 between the transfer plate 410 and the main conveyor line to prevent objects being transported by the conveyor belts from falling into or being caught in the gap 408. The left end of the spacer 430 is connected to the position adjusting mechanism 420 so as to translate together with it in the lengthwise direction of the conveyor belts as the position of the transfer plate 410 is shifted. For example, the spacer 430 can be connected to the support plate 421 of the position adjusting mechanism 420 by a connecting pin or a bolt. Due to the flexibility of the spacer 430, it is generally easier for the position adjusting mechanism 420 to pull the spacer 430 along the gap 408 than to push it. Therefore, a similar position adjusting mechanism 420 (without a transfer plate 410 attached to it) may be connected to the other lengthwise end of the spacer 430. When the transfer plate 410 is to be moved to the left in FIG. 23, the illustrated position adjusting mechanism 420 can pull the spacer 430 to the left, and when the transfer plate 410 is to be moved to the right in the figure, an unillustrated position adjusting mechanism 420 connected to the right end of the spacer 430 can pull the spacer 430 to the right.

When the width of the gap 408 between the conveyor belts 400 and 405 is at its design value, the spacer 430 is preferably between its fully contracted and its fully expanded states so that the spacer 430 can contract or expand as the width of the gap 408 varies from its design value along the length of the gap. In order to minimize the width of the gap between opposing links of the spacer 430, the dimensions of the spacer 430 may be selected so that the spacer 430 will be fully contracted (with opposing links contacting each other) when the gap 408 between the conveyor belts 400, 405 is a minimum. For example, if the width of the gap 408 is expected to vary from its design value by at most ±x inches along its length, the spacer 430 may be selected so that the widthwise separation between opposing links is x inches when the gap 408 is at its design width. When the gap 408 decreases to its minimum value (the design width −x inches), the spacer 430 will be fully contracted and opposing links will contact each other. On the other hand, when the gap 408 increases to its maximum value (the design width +x inches), the widthwise separation between opposing links will be 2x inches. This widthwise separation is preferably less than the maximum separation of the links in the fully expanded state of the spacer 430 so that the biasing members of the spacer 430 can maintain the links engaged with the conveyor belts 400, 405 when the gap 408 is at its maximum width. In one example of an accumulator with which a spacer according to the present invention can be used, the width of the gap 408 between two conveyor belts is approximately 1.6±0.3 inches, so the spacer is sized such that the widthwise separation between opposing links is 0.3±0.3 inches. In other words, the widthwise separation between the links varies between 0 and 0.6 inches as the width of gap 408 varies.

The spacer 430 is capable of bending in a horizontal plane, so it can smoothly follow the curved path of the gap 408 between the conveyor belts. The ability of the spacer 430 to vary in width enables the spacer 430 to reliably engage both conveyor belts on opposite sides of the gap 408 even if the width of the gap 408 varies along its length. It also enables the same spacer 430 to be used with a different accumulator having a gap 408 with a different width.

If desired, a vertical partition or similar member can be mounted on the spacer 430 (such as in holes which can be formed in the top sides of the links) to prevent objects from being pushed from one conveyor belt to another except at the transfer plate 410 due to lateral forces which sometimes develop when the conveyor belts are crowded with objects being transported.

What is claimed is:

1. A variable-width spacer for installation in a gap between components of a conveying apparatus comprising:
   a first link having an outer side for moving contact with a first component of a conveying apparatus and an inner side;
   a second link having an outer side for moving contact with a second component of a conveying apparatus and an inner side facing the inner side of the first link; and
   a guide which guides the first and second links for relative movement in a widthwise direction of the spacer to adjust a width of the spacer.

2. A spacer as claimed in claim 1 wherein the guide comprises a pin extending between the links and slidably engaging one of the links.

3. A variable-width spacer for installation in a gap between components of a conveying apparatus comprising:
   a plurality of first links connected in series on a first widthwise side of the spacer and a plurality of second links connected in series on a second widthwise side of the spacer opposing the first links, the first and second links being capable of relative movement in a widthwise direction of the spacer to adjust a width of the spacer.

4. A spacer as claimed in claim 3 including guides which guide the first and second links for relative movement towards and away from each other in the widthwise direction of the spacer.

5. A spacer as claimed in claim 4 wherein the guides comprise pins extending between the first and second links.

6. A spacer as claimed in claim 3 including biasing members urging the first and second links away from each other.

7. A spacer as claimed in claim 6 wherein the biasing members comprise springs disposed between the first and second links.

8. A spacer as claimed in claim 3 wherein the first and second links can undergo relative movement to overlap each other in the widthwise direction of the spacer along a top side of the spacer.

9. A spacer as claimed in claim 8 wherein the first and second links include portions of complementary shape along a top side of the spacer.

10. A spacer as claimed in claim 9 wherein the first and second links include portions of complementary shape along a bottom side of the spacer.

11. A spacer as claimed in claim 3 wherein each link has an inner side facing an opposite widthwise side of the spacer, one of the first links includes a recess in its inner side extending to its upper side, and an opposing one of the second links includes a projection in its inner side extending to its upper side for engagement with the recess in the one of the first links.

12. A spacer as claimed in claim 11 wherein the one of the first links includes a projection in its inner side extending to its bottom side, and the one of the second links includes a recess in its inner side extending to its bottom side for engagement with the projection in the one of the first links.

13. A spacer as claimed in claim 12 wherein the recess and the projection in the one of the first links are aligned with each other, and the recess and the projection in the one of the second links are aligned with each other.

14. A spacer as claimed in claim 11 wherein the recess and the projection extend for less than an entire height of the links in which they are formed.

15. A spacer as claimed in claim 3 wherein adjoining links can pivot with respect to each other to enable the spacer to assume a curved shape in a gap.

16. A spacer as claimed in claim 3 wherein each link has a first end and a second end, the first end overlapping the second end of an adjoining link in a lengthwise direction of the spacer.

17. A spacer as claimed in claim 3 wherein each link has a bearing surface for moving contact with a member adjoining the spacer.

18. A spacer as claimed in claim 17 wherein each link has a first bearing surface adjoining an upper side thereof, a second bearing surface adjoining a lower side thereof, and a projection disposed between the bearing surfaces for engagement with a groove of a member adjoining the spacer.

19. A spacer as claimed in claim 3 wherein a distance from a point on one of the first links to an opposing one of the second links on an opposite widthwise side of the spacer is less than a widthwise separation between the one of the first links and the one of the second links.

20. A variable-width spacer for installation in a gap between components of a conveying apparatus comprising:
 a first link and a second link disposed on opposite widthwise sides of the spacer and movable relative to each other in a widthwise direction of the spacer to vary a width of the spacer, the first link including a finger overlapping the second link in the widthwise direction of the spacer and covering a gap between the spacers beneath the finger.

21. A spacer as claimed in claim 20 wherein the first link includes a plurality of fingers overlapping the second link in the widthwise direction of the spacer and the second link includes a finger interfitting with the fingers of the first link and overlapping the first link in the widthwise direction of the spacer, each finger covering a gap beneath it formed between the links.

22. A variable-width spacer for installation in a gap between components of a conveying apparatus comprising:
 a first link having an outer side for moving contact with a first component of a conveying apparatus and an inner side;
 a second link having an outer side for moving contact with a second component of a conveying apparatus and an inner side facing the inner side of the first link, the links being capable of relative movement in a widthwise direction of the spacer to adjust a width of the spacer; and
 a biasing member disposed between the first and second links and urging the links away from each other in a widthwise direction of the spacer.

23. A spacer as claimed in claim 22 including a guide extending between the first and second links and guiding the links for relative movement in the widthwise direction of the spacer.

24. A spacer as claimed in claim 22 wherein the outer side of the first link includes a projection for moving engagement with a groove in the first component of the conveying apparatus.

25. A conveying apparatus including first and second components separated by a gap and a variable-width spacer disposed in the gap and comprising a first link on a first widthwise side of the spacer and a second link on a second widthwise side of the spacer opposing the first link, the first and second links being movable with respect to each other in the widthwise direction of the spacer to vary the width of the spacer.

26. A conveying apparatus as claimed in claim 25 wherein each link has an inner side opposing a link on the opposite widthwise side of the spacer and an outer side in moving contact with one of the components.

27. A conveying apparatus as claimed in claim 25 wherein the first and second components respectively comprise a first and a second conveyor belt extending alongside the first conveyor belt and separated from the first conveyor belt by the gap.

28. A conveying apparatus as claimed in claim 27 wherein the first link adjoins the first conveyor belt, the second link adjoins the second conveyor belt, an outer edge of a top side of the first link is higher than an adjoining edge of a top side of the first conveyor belt, an inner edge of a top side of the second link is higher than an inner edge of the top side of the first link, and an outer edge of the top side of the second link is lower than an adjoining edge of a top side of the second conveyor belt.

29. A conveying apparatus as claimed in claim 27 wherein the gap includes a curved portion in which a portion of the spacer is disposed.

30. A conveying apparatus as claimed in claim 27 wherein each link has an outer surface which interfits with one of the conveyor belts.

31. A conveying apparatus as claimed in claim 30 wherein each link has a projection in its outer surface which engages with a groove in one of the conveyor belts.

32. A conveying apparatus as claimed in claim 25 wherein the spacer includes a plurality of first links connected in series on the first widthwise side of the spacer and a plurality of second links connected in series on the second widthwise side of the spacer.

33. A conveying apparatus as claimed in claim 32 wherein adjoining links can pivot with respect to each other to enable the spacer to assume a curved shape in the gap.

34. A conveying apparatus as claimed in claim 32 wherein one of the first links has an upstream end covered by a downstream end of an adjoining first link on an upstream side thereof and one of the second links has an upstream end covered by a downstream end of an adjoining second link on an upstream side thereof.

35. A method of operating a conveying apparatus comprising transporting an object using the conveying apparatus with a variable-width spacer disposed in a gap between first and second components of the conveying apparatus.

36. A method as claimed in claim 35 including varying a width of the spacer by producing relative movement of first and second links of the spacer in a widthwise direction of the spacer.

37. A method as claimed in claim 35 including disposing an outer side of a first link of the spacer in moving contact with the first component and an outer side of a second link of the spacer opposing the first link in moving contact with the second component.

38. A method as claimed in claim 35 including urging the first and second links away from each other in a widthwise direction of the spacer with a biasing member.

39. A method as claimed in claim 35 including moving one of the components of the conveying apparatus with respect to the spacer in a lengthwise direction of the spacer.

40. A method as claimed in claim 39 including moving the first and second components of the conveying apparatus in opposite directions from each other.

41. A method as claimed in claim 35 wherein the first and second components of the conveying apparatus comprise first and second conveyor belts.

42. A method as claimed in claim 41 including engaging the spacer with lengthwise grooves in the conveyor belts.

43. A method as claimed in claim 41 including sliding an object between the first and second conveyor belts across a top side of the spacer.

44. A method as claimed in claim 43 including sliding the object downward over a step from one of the conveyor belts to the spacer and downward over a step from the spacer to the other conveyor belt.

45. A method as claimed in claim 35 including translating the spacer within the gap in a lengthwise direction of the gap.

46. A method as claimed in claim 35 including disposing the spacer in a curved portion of the gap.

* * * * *